United States Patent
Miyatake et al.

(10) Patent No.: US 7,385,181 B2
(45) Date of Patent: Jun. 10, 2008

(54) OPTICAL SCANNING DEVICE AND IMAGE FORMING DEVICE

(75) Inventors: Naoki Miyatake, Kanagawa (JP); Makoto Hirakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/717,009

(22) Filed: Mar. 13, 2007

(65) Prior Publication Data

US 2007/0215800 A1    Sep. 20, 2007

(30) Foreign Application Priority Data

Mar. 14, 2006    (JP)    ............... 2006-068721

(51) Int. Cl.
*H01J 40/14* (2006.01)
*G02B 26/08* (2006.01)

(52) U.S. Cl. ............... 250/234; 250/236; 359/205; 347/244

(58) Field of Classification Search ............... 250/234, 250/235, 236; 359/204, 205, 212, 216; 347/241, 347/243, 244
See application file for complete search history.

(56) References Cited

U.S. PATENT DOCUMENTS

| | | | |
|---|---|---|---|
| 6,621,512 B2 | 9/2003 | Nakajima et al. | |
| 6,771,300 B2 | 8/2004 | Amada et al. | |
| 6,804,064 B2 | 10/2004 | Hirakawa | |
| 6,813,051 B2 | 11/2004 | Suzuki et al. | |
| 6,829,102 B2 | 12/2004 | Ohashi et al. | |
| 6,987,593 B2 | 1/2006 | Hayashi et al. | |
| 7,050,082 B2 | 5/2006 | Suzuki et al. | |
| 7,050,210 B2 | 5/2006 | Atsuumi et al. | |
| 7,079,326 B2 | 7/2006 | Hirakawa | |
| 7,088,484 B2 | 8/2006 | Hayashi et al. | |
| 7,154,651 B2 | 12/2006 | Atsuumi et al. | |
| 7,161,724 B1 | 1/2007 | Miyatake | |
| 7,167,288 B2 | 1/2007 | Miyatake et al. | |
| 2003/0011830 A1 | 1/2003 | Miyatake | |
| 2004/0184127 A1 | 9/2004 | Nakajima et al. | |
| 2004/0240000 A1 | 12/2004 | Miyatake et al. | |
| 2005/0094234 A1 | 5/2005 | Miyatake et al. | |
| 2005/0200910 A1 | 9/2005 | Kanoshima et al. | |
| 2006/0000990 A1 | 1/2006 | Hayashi et al. | |
| 2006/0203264 A1 | 9/2006 | Miyatake | |

(Continued)

FOREIGN PATENT DOCUMENTS

JP    09-054263    2/1997

(Continued)

*Primary Examiner*—Kevin Pyo
(74) *Attorney, Agent, or Firm*—Harness, Dickey & Pierce, P.L.C.

(57) ABSTRACT

Light beams emitted from a plurality of light source devices are deflected by a shared light deflector. The light beams are respectively concentrated on different scanning subjects using a first scanning lens and second scanning lenses and are used to perform a scan. All light beams make an angle in a sub-scanning direction to a normal line of a reflecting surface of the light deflector. An incidence surface of the first scanning lens is a surface of which a curvature in the sub-scanning direction changes depending on a main scanning direction. The incidence surface of the first scanning lens is also an optical surface of which a negative refracting power becomes stronger toward a periphery of the surface in the main scanning direction.

11 Claims, 16 Drawing Sheets

U.S. PATENT DOCUMENTS

2007/0002417 A1 1/2007 Hirakawa et al.
2007/0091398 A1* 4/2007 Ueda et al. .................. 359/18

FOREIGN PATENT DOCUMENTS

| | | |
|---|---|---|
| JP | 10-073778 | 3/1998 |
| JP | 11-014932 | 1/1999 |
| JP | 11-038348 | 2/1999 |
| JP | 2001-004948 | 1/2001 |
| JP | 2001-010107 | 1/2001 |
| JP | 2001-033720 | 2/2001 |
| JP | 2003-005114 | 1/2003 |
| JP | 2004-070109 | 3/2004 |

* cited by examiner

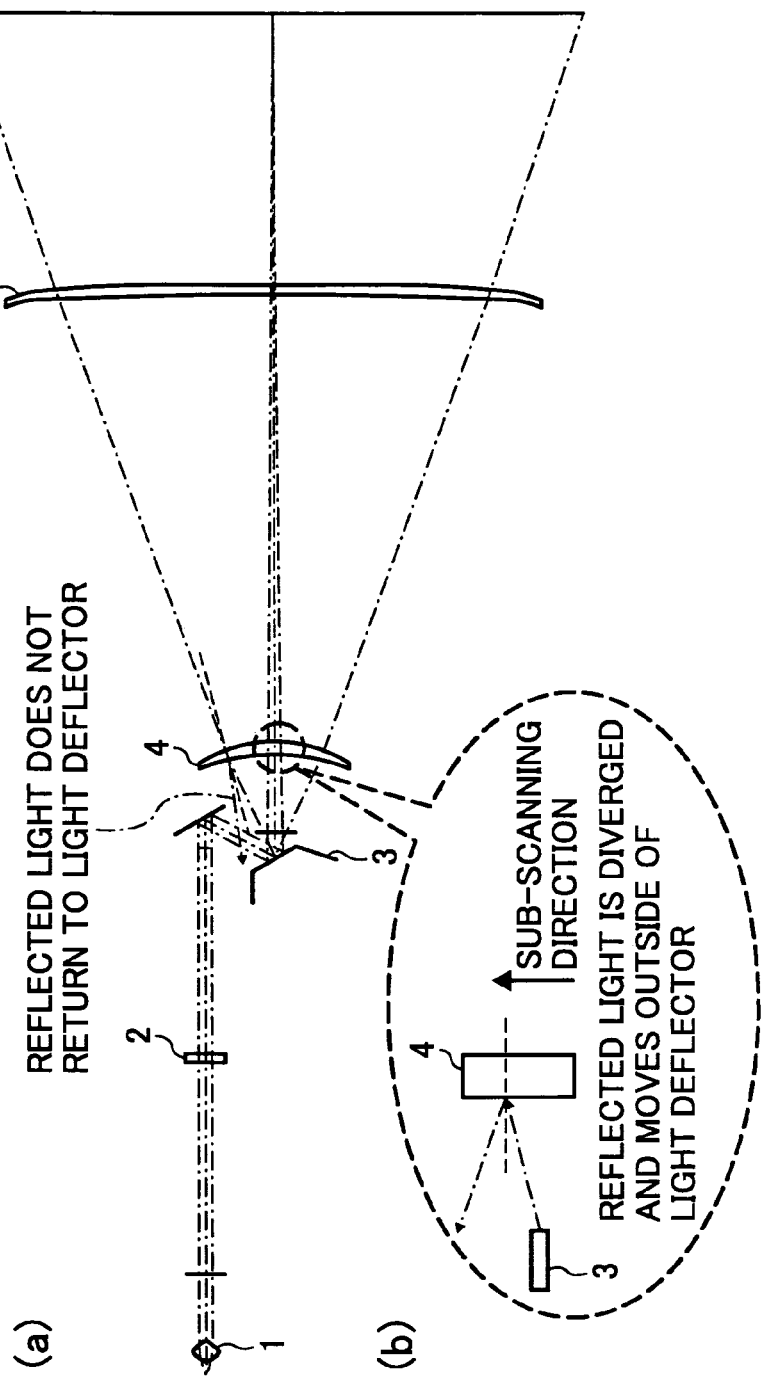

- DIRECTION OF EMISSION BEAMS CHANGE

INCIDENCE BEAMS ARE SHIFTED TO SUB-SCANNING DIRECTION

- SCANNING LINE CURVATURE CHANGE IS SIGNIFICANT
- BEAM DIAMETER DETERIORATION IS SIGNIFICANT

- EMISSION BEAMS ARE SHIFTED IN PARALLEL

INCIDENCE BEAMS ARE SHIFTED TO SUB-SCANNING DIRECTION

- SCANNING LINE CURVATURE CHANGE IS SMALL
- BEAM DIAMETER DETERIORATION IS SMALL 43Y, 43M, 43C, 43K: PHOTORECEPTORS
45Y, 45M, 45C, 45K: OPTICAL SCANNING SYSTEM

| SURFACE NUMBER | RY(mm) | RZ(mm) | X(mm) | N | REMARKS |
|---|---|---|---|---|---|
| DEFLECTIVE SURFACE | ∞ | ∞ | 37.48 | - | DEFLECTIVE SURFACE |
| 1* | -76.829 | ∞ | 5.00 | 1.5240 | SCANNING IMAGING LENS |
| 2 | -49.275 | ∞ | 161.00 | - | - |
| 3* | -3690 | 34.651 | 3.00 | 1.5240 | SCANNING IMAGING LENS |
| 4 | 910.251 | ∞ | 97.00 | - | - |
| 5 | - | - | - | - | SCANNING-SUBJECT SURFACE |

FIG. 11

| | FIRST SURFACE | SECOND SURFACE | THIRD SURFACE | FOURTH SURFACE |
|---|---|---|---|---|
| RY | -76.829 | -49.275 | -3690 | 910.251 |
| K | 0 | 0 | 0 | 0 |
| A | -3.155E-07 | -5.250E-08 | -1.182E-07 | -1.907E-07 |
| B | -1.342E-10 | -3.123E-10 | -9.540E-12 | -3.920E-12 |
| C | -1.004E-12 | 5.590E-13 | 4.231E-15 | 2.953E-15 |
| D | -3.049E-15 | -5.599E-15 | -1.906E-19 | -6.203E-20 |
| E | 7.782E-18 | 7.559E-18 | -2.921E-24 | -7.112E-24 |
| F | - | - | - | - |
| RZ | ∞ | ∞ | 34.651 | ∞ |
| a | - | - | -1.348E-07 | - |
| b | -1.259E-05 | - | -6.226E-07 | - |
| c | - | - | 1.945E-10 | - |
| d | -6.711E-09 | - | 3.916E-10 | - |
| e | - | - | -1.860E-14 | - |
| f | 1.796E-11 | - | -2.676E-13 | - |
| g | - | - | - | - |
| h | -2.062E-14 | - | 8.296E-17 | - |
| i | - | - | - | - |
| j | 2.676E-17 | - | -1.180E-20 | - |
| k | - | - | - | - |
| l | 1.861E-19 | - | 6.173E-25 | - |
| F0 | - | - | - | - |
| F1 | - | - | - | 6.352E-08 |
| F2 | - | - | - | -3.422E-08 |
| F3 | - | - | - | -5.563E-11 |
| F4 | - | - | - | -4.949E-12 |
| F5 | - | - | - | -4.843E-14 |
| F6 | - | - | - | 6.895E-16 |
| F7 | - | - | - | -9.900E-18 |
| F8 | - | - | - | 1.006E-19 |
| F9 | - | - | - | 6.615E-22 |
| F10 | | - | - | -1.149E-23 |

FIG. 12

|     | FIRST SURFACE | SECOND SURFACE | THIRD SURFACE | FOURTH SURFACE |
| --- | --- | --- | --- | --- |
| RY | -76.829 | -49.275 | -3690 | 1157 |
| K | 0 | 0 | 0 | 0 |
| A | -3.155E-07 | -5.250E-08 | -4.108E-08 | -1.119881E-07 |
| B | -1.342E-10 | -3.123E-10 | -1.553E-11 | -1.107220E-11 |
| C | -1.004E-12 | 5.590E-13 | 4.234E-15 | 3.293753E-15 |
| D | -3.049E-15 | -5.599E-15 | -1.545E-19 | -5.151512E-20 |
| E | 7.782E-18 | 7.559E-18 | -7.678E-24 | -1.113210E-23 |
| F | – | – | – | – |
| RZ | ∞ | ∞ | 34.720268 | ∞ |
| a | – | – | -8.455E-08 | – |
| b | -1.259E-05 | – | -3.651E-07 | – |
| c | – | – | 1.431E-10 | – |
| d | -6.711E-09 | – | -9.001E-11 | – |
| e | – | – | -1.134E-14 | – |
| f | 1.796E-11 | – | 1.952E-14 | – |
| g | – | – | – | – |
| h | -2.062E-14 | – | 5.136E-18 | – |
| i | – | – | – | – |
| j | 2.676E-17 | – | -1.929E-21 | – |
| k | – | – | – | – |
| l | 1.861E-19 | – | 1.449E-25 | – |
| F0 | – | – | – | – |
| F1 | – | – | – | 1.281E-07 |
| F2 | – | – | – | -7.402E-08 |
| F3 | – | – | – | -7.893E-11 |
| F4 | – | – | – | -6.376E-11 |
| F5 | – | – | – | 6.467E-14 |
| F6 | – | – | – | 2.658E-14 |
| F7 | – | – | – | -1.207E-17 |
| F8 | – | – | – | -3.805E-18 |
| F9 |  | – |  | 7.862E-22 |
| F10 |  | – |  | 1.875E-22 |

OPTICAL SCANNING DEVICE AND IMAGE FORMING DEVICE

CROSS-REFERENCE TO RELATED APPLICATIONS

The present document incorporates by reference the entire contents of Japanese priority document, 2006-068721 filed in Japan on Mar. 14, 2006.

BACKGROUND OF THE INVENTION

1. Field of the Invention

The present invention generally relates to an optical scanning device used in an image forming device, and specifically relates to optical scanning devices that respectively scans different scanning-subject surfaces using a respective optical beam.

2. Description of the Related Art

An optical scanning device, widely known in relation to laser printers and the like, generally has a following configuration. The optical scanning device deflects an optical beam emitted from a light source using a light deflector. The optical scanning device concentrates light onto a scanning-subject surface using an optical scanning and imaging system, such as an fθ (f-theta) lens, and forms a light spot on the scanning-subject surface. The optical scanning device performs an optical scan (main scan) on the scanning-subject surface using the light spot. The scanning-subject surface is a photosensitive surface of a photosensitive medium that is, for example, a photoconductive photoreceptor in an electronic image forming device.

An example of a full-color image forming device is a following electronic image forming device. In the electronic image forming device, four photoreceptors are arrayed in a direction in which a recording paper is carried. A single deflecting unit deflection-scans light beams emitted from a plurality of light source units. The light source units are provided in correspondence with each photoreceptor. A plurality of optical scanning and imaging systems corresponding to each photoreceptor simultaneously perform exposure on each photoreceptor and form latent images. A developing unit visualizes each latent image using developers of differing colors, such as yellow, magenta, cyan, and black. The visualized images are successively superimposed and transferred onto a same sheet of recording paper. Then, the electronic image forming device fixes the transferred images and obtains a color image.

The image forming device using two sets or more of a combination of the optical scanning device and the photoreceptor in this way to obtain a two-color image, a multicolor image, a color image, or the like is known as a tandem-type image forming device. Such tandem-type image forming devices can be configured so that the, photoreceptors share a single light deflector.

FIG. 14A is a perspective view of a configuration of a conventional tandem-type image forming device. FIG. 14B is an enlarged perspective view of a main section of a light source periphery shown in FIG. 14A.

In FIG. 14A, light beams L are emitted from four light sources 101a to 110d and incident on a polygon mirror 102. The polygon mirror 102 is a single light deflector. Each light beam L is concentrated onto four photoreceptor drums 104 as light spots, via an optical system 103. The light spots scan photosensitive surfaces of the photoreceptor drums 104. The photoreceptor drums 104 are scanning-subject surfaces corresponding to each following color: cyan (C), magenta (M), yellow (Y), and black (K). The optical system 103 includes a coupling lens, a cylinder lens, a scanning lens, a reflecting mirror, and the like.

FIG. 14B is an enlarged view of a periphery of the light sources 101a to 101d and the polygon mirror 102 in FIG. 14A. The optical scanning device has an opposed-scanning method configuration in which the light beams L are irradiated onto deflective reflecting surfaces facing the polygon mirror 102.

In Japanese Patent No. 3295281, a following configuration is described. A plurality of light beams that are roughly parallel and separated in a sub-scanning direction are incident on a light deflector. A plurality of scanning optics corresponding to the light beams are arrayed in the sub-scanning direction and perform a scan. In Japanese Patent Application Laid-open No. 2001-4948, Japanese Patent Application Laid-open No. 2001-10107, and Japanese Patent Application Laid-open No. 2001-33720, a following configuration is described. Light beams are incident from one side of a light deflector. An optical scanning system has a three-lens structure. A plurality of light beams moving toward different scanning-subject surfaces pass through scanning lenses L1 and L2. A scanning lens L3 is provided for each scanning-subject surface.

In configurations such as these, in which the light deflector is shared among a plurality of scanning-subject surfaces, the image forming device can be made compact by a reduction in a number of light deflectors.

The number of light deflectors can be reduced in the optical scanning device of a full-color image forming device having, for example, four different scanning-subject surfaces (photoreceptors) corresponding to cyan, magenta, yellow, and black. However, because the light beams moving toward the photoreceptors in the sub-scanning direction are lined in a rough parallel and incident on the light deflector, the polygon mirror forming the light deflector is enlarged in the sub-scanning direction. Generally, among optical elements included in the optical scanning device, the polygon mirror is expensive. The expensiveness of the polygon mirror interferes with a reduction in cost and a reduction in size of the overall device.

In the optical scanning device of the color image forming device, an oblique incidence optical system has recently become known as a means for achieving reduced cost through use of the single light deflector. In the oblique incidence optical system, the light beams are incident on the deflective reflecting surface of the light deflector in the sub-scanning direction at an angle (refer to Japanese Patent Application Laid-open No. 2003-5114).

In the oblique incidence optical system, the light beams are respectively deflected and reflected by the deflective reflecting surface of the light deflector. Then, the light beams are separated by a reflecting mirror or the like and respectively led to corresponding scanning-subject surfaces. In this configuration, an angle of each light beam in the sub-scanning direction (angle at which the light beam is obliquely incident on the light deflector) is set to an angle allowing the reflecting mirror to separate each light beam.

Through the use of the oblique incidence optical system, space between adjacent light beams in the sub-scanning direction allowing the reflecting mirror, to separate each light beam can be secured without an increase in light reflector size (increase in stages and thickness of the polygon mirror in the sub-scanning direction).

However, in an oblique incidence method used in the above-described oblique incidence optical system, image height variations in beam spot diameters increase because of an occurrence of scanning line curvature and deterioration of wavefront aberration.

An amount of scanning line curvature occurrence differs depending on an oblique incidence angle of each light beam in the sub-scanning direction. When latent images written using each light beam are superimposed and visualized using toners of each color, the scanning line curvature appears as color shifts. The light beam is incident on the scanning lens in a twisted state because the light beam is obliquely incident. As a result, the wavefront aberration increases, optical performance, particularly in peripheral image heights, is significantly deteriorated, and the beam spot diameter is widened, thereby interfering with formation of higher-quality images.

In an oblique incidence method, the light beams from the light sources are incident toward a rotation axis of the polygon mirror. Therefore, when the light sources are disposed in positions overlapping with an optical axis of the scanning lens in a main scanning direction, the oblique incidence angle is increased to avoid interference with the scanning lens.

As a method for correcting significant scanning line curvature that is a phenomenon unique to the oblique incidence method, following configurations are proposed. For example, an optical scanning and imaging lens system includes a lens having a lens surface that shifts an inherent tilt of the lens surface within a sub-scanning cross-section in a main scanning direction to correct the scanning line curvature (refer to Japanese Patent Application Laid-open No. H11-14932). Alternatively, an optical scanning and imaging system includes a corrective reflecting surface having a reflecting surface that shifts an inherent tilt of the reflecting surface within the sub-scanning cross-section in the main scanning direction to correct the scanning line curvature (refer to Japanese Patent Application Laid-open No. H11-38348).

In Japanese Patent Application Laid-open No. 2004-70109, a following configuration is described. An obliquely incident light bundle passes off-axis of the scanning lens. Positions of scanning lines are aligned using a surface that changes an amount of aspheric surfaces of child lines of the scanning lens in the sub-scanning direction. In Japanese Patent Application Laid-open No. 2004-70109, an example is given in which the scanning line curvature correction is performed in one scanning lens. In this example, although the scanning line curvature can be corrected, degradation of the beam spot diameter caused by increased wavefront aberration, described hereafter, is not described.

Another problem regarding the oblique incidence method is that significant deterioration of the wavefront aberration easily occurs in peripheral image height (near both ends of the scanning lines) because of skew ray. When such wavefront aberrations occur, spot diameters of the light spots in the peripheral image height become widened. In other words, variations in beam spot diameters among image heights occur. If this problem cannot be solved, high-quality images that have been in strong demand in recent years cannot be achieved. In the optical scanning devices described in Japanese Patent Application Laid-open No. H11-14932, Japanese. Patent Application Laid-open No. H11-38348, and Japanese Patent Application Laid-open No. 2004-70109, significant scanning line curvature unique to the oblique incidence method is successfully corrected. However, the correction of the wavefront aberration is insufficient.

As an optical scanning device that can successfully correct the scanning line curvature and the deterioration of the wavefront aberration that are problematic in the oblique incidence method, as described above, a following optical scanning device is proposed (refer to Japanese Patent No. 3450653). An optical scanning and imaging system includes a plurality of rotating asymmetric lenses. A shape of a mother line connecting vertices of child lines of lens surfaces of the rotating asymmetric lenses is curved in a sub-scanning direction.

However, the lenses having the lens surfaces of which the shape of the mother line connecting the vertices of the child lines is curved in the sub-scanning direction solves the above-described problems by the mother line being curved. As a result, individual scanning lenses corresponding to the incident light beam are required. Therefore, when the lenses are applied to a tandem-type optical scanning system, a number of scanning lenses is increased.

When light beams moving toward different scanning-subject surfaces are incident on a same lens, the above-described problems are solved for one light beam by the shape of the mother line being curved. However, reduction of the scanning line curvature and the wavefront aberration in another light beam becomes difficult.

The curvature of the mother line is in the sub-scanning direction. Therefore, when the light beams incident on the same lens shift in the sub-scanning direction because of influence from an assembly error, a processing error, environmental changes, or the like, a shape of the scanning line curvature changes as a result of influence from a refracting power of the lens in the sub-scanning direction. An initial (or design-stage) color shift control effect on a color image cannot be acquired. As a result, color shifting occurs.

Furthermore, even in the wavefront aberration correction, the changes in a skew state of the light beam are significant on the surface having the curvature because of the incident light beam being blurred. Therefore, stably obtaining a favorable beam spot diameter is difficult.

The scanning line curvature correction is performed in Japanese Patent Application Laid-open No. H11-14932 using the same surface as that in the Japanese Patent No. 3450653. Japanese Patent Application Laid-open No. H11-14932 describes the configuration using the oblique incidence method. However, as described earlier, stably obtaining a favorable beam spot diameter is difficult.

Technological issues of the present invention are to solve the problems of the conventional technology and to:
(1) provide an optical scanning device that can effectively correct the scanning line curvature and the deterioration of the wavefront aberration in an oblique incidence method optical scanning device suitable for achieving low costs, low power consumption, and reduced size; and
(2) provide an image forming device that effectively corrects the scanning line curvature and the deterioration of the wavefront aberration in an oblique incidence method optical scanning device in which color shift occurrence is minimal even during temperature changes.

SUMMARY OF THE INVENTION

It is an object of the present invention to at least partially solve the problems in the conventional technology.

According to an aspect of the present invention, an optical scanning device including a plurality of light sources in which light beams emitted from the light sources are deflected by a shared light deflector and each deflected light beam is concentrated on different scanning-subject surfaces using an optical scanning system, wherein the light beams emitted from the light sources make an angle in a sub-scanning direction to a normal line of a reflecting surface of the light deflector, and an incidence surface of at least one lens element included in the optical scanning system has a surface of which a curvature in the sub-scanning direction changes depending on a main scanning direction and is an optical surface of which a negative refracting power becomes stronger toward a periphery of the surface in the main scanning direction.

According to another aspect of the present invention, an image forming device including at least one image carrying body and an optical scanning device including an optical scanning and imaging system corresponding to the image carrying body that performs image formation by performing an optical scan on the image carrying body, the optical scanning device including a plurality of light sources in which light beams emitted from the light sources are deflected by a shared light deflector and each deflected light beam is concentrated on different scanning-subject surfaces using an optical scanning system, wherein the light beams emitted from the light sources make an angle in a sub-scanning direction to a normal line of a reflecting surface of the light deflector, and an incidence surface of at least one lens element included in the optical scanning system has a surface of which a curvature in the sub-scanning direction changes depending on a main scanning direction and is an optical surface of which a negative refracting power becomes stronger toward a periphery of the surface in the main scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A to FIG. 1C are diagrams explaining an optical scanning device according to a first embodiment of the present invention, in which FIG. 1A is a planar view of an optical system of the optical scanning device, FIG. 1B is a front elevational view of a main section of the optical system, and FIG. 1C is a front elevational view of the optical system and scanning subjects;

FIG. 6A and FIG. 6B are diagrams explaining light reflection in the second lens (L2) according to the embodiment, in which FIG. 6A is a planar view of the optical system; FIG. 6B is a front elevational view of a main section;

FIG. 11 is a diagram of scanning lens shape data corresponding to an oblique incidence angle of ±1.46 degrees according to the embodiment;

FIG. 12 is a diagram of scanning lens shape data corresponding to an oblique incidence angle of ±3.3 degrees according to the embodiment;

FIG. 13A and FIG. 13B are diagrams of optical performances of a scanning lens according to the present invention, in which FIG. 13A is a diagram of aberrations occurring when an oblique incidence angle is ±3.3 degrees and FIG. 13B is a diagram of aberrations occurring when an oblique incidence angle is ±1.46 degrees;

DETAILED DESCRIPTION OF THE PREFERRED EMBODIMENTS

Exemplary embodiments of the present invention are below described with reference to the attached drawings.

Figure 1A:
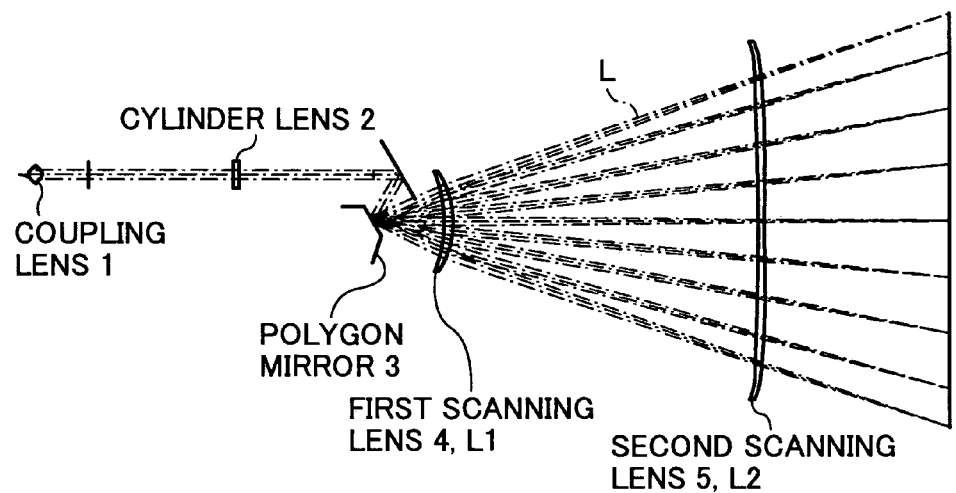
Figure 1B:
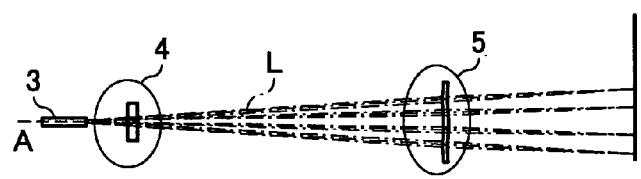
Figure 1C:
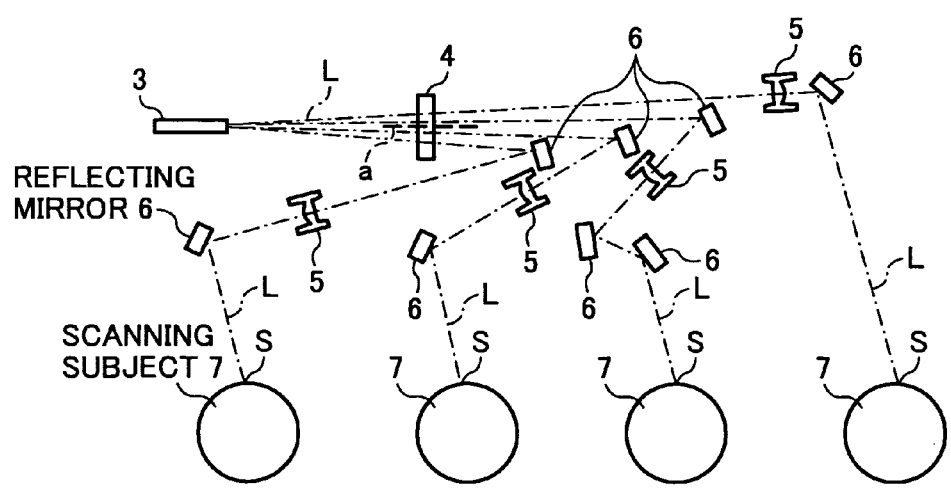

FIG. 1A, FIG. 1B, and FIG. 1C are diagrams explaining an optical scanning device according to a first embodiment of the present invention. FIG. 1A is a planar view of an optical system of the optical scanning device. FIG. 1B is a front elevational view of a main section of the optical system. FIG. 1C is a front elevational view of the optical system and scanning subjects.

In FIG. 1A to FIG. 1C, a divergent light bundle (light beams) L emitted from a semiconductor laser forming a light source device (not shown) are converted to a light ray form suitable for a subsequent optical system by a coupling lens 1. The light ray form to which the light beams L are converted by the coupling lens 1 can be a parallel light bundle. Alternatively, the light beams L can be a light bundle having a weak divergence or a weak convergence.

A cylinder lens 2 concentrates the light beams L from the coupling lens 1 in a sub-scanning direction. The light beams are incident on a deflective reflecting surface of a rotating polygon mirror (light deflector) 3 formed from a polygon mirror. As shown in FIG. 1B, the light beams L from a light-source side are incident at an angle to a plane A. The plane A is perpendicular to a rotation axis of the deflective reflecting surface of the light deflector 3. Therefore, the light beams L reflected by the light deflector 3 are also at an angle to the plane A.

The light beams L are at an angle to the plane A perpendicular to the rotation axis of the light deflector 3. To give the light beams L the angle, the optical system on an incidence side, such as the light source device, the coupling lens 1, the cylinder lens 2, and the like, can be tilted at a predetermined angle and disposed. Alternatively, a light deflecting element, such as a reflecting mirror, can be disposed before the light deflector 3, and the light beams L can be given the angle using the light deflecting element. Further, the light beams L moving toward the deflective reflecting surface can be given an angle by an optical axis of the cylinder lens 2 being shifted in the sub-scanning direction.

As shown in FIG. 1C, the light beams L reflected by the light deflector 3 are deflected at an equiangular velocity with a constant rotation of the light deflector 3. According to the embodiment, the light beams L pass through an optical scanning system including a first scanning lens (L1) 4, a plurality of second scanning lenses (L2) 5, and a reflecting mirror 6. The light beams L travel at an equal speed and concentrated on a plurality of scanning subjects 7 (four scanning subjects according to the embodiment). As a result, the deflected light beams L form light spots S on the surfaces of the scanning subjects 7 and perform an optical scanning of the scanning-subject surfaces.

FIG. 1B and FIG. 1C are diagrams of the optical scanning system viewed from the sub-scanning direction. FIG. 1B is an extended view in which the reflecting mirror is omitted. Therefore, the second scanning lenses (L2) 5 are drawn so as to overlap.

On the first surface of the first scanning lens (L1) 4 near the light deflector 3, the light beams L moving toward different scanning subjects 7 pass in the sub-scanning direction to a reference axis a. The light beams L do not pass through the reference axis a. In other words, the first scanning lens (L1) 4 is a scanning lens shared by the light beams L from a plurality of light source devices. The reference axis a includes a normal line of the deflective reflecting surface and a center in the sub-scanning direction of a reflecting point of the light beams L from the light source devices on the deflective reflecting surface.

Although a shape of a surface of the first scanning lens (L1) 4 will be described hereafter, an incidence surface of the first scanning lens (L1) 4 is a special surface (optical surface). The special surface includes a surface of which a curvature in the sub-scanning direction changes depending on a main scanning direction. In addition, the special surface includes a surface of which a negative refracting power becomes stronger toward a periphery of the surface in the main scanning direction. Functions and detailed shape of the special surface will be described hereafter.

As described above, each light beam L from the light source devices or, in other words, the light beams L respectively moving toward different scanning subjects 7 share the first scanning lens (L1) 4. The second scanning lenses (L2) 5 are disposed on a scanning-subject side, for each light beam L moving toward the different scanning subjects 7.

The second scanning lenses (L2) 5 have a strong refracting power mainly in the sub-scanning direction. As will be described hereafter, a shared lens preferably has a small refracting power in the sub-scanning direction. The second scanning lenses (L2) 5 disposed for each light beam L moving towards the different scanning subjects 7 have a large refracting power in the sub-scanning direction. The second scanning lenses (L2) function to concentrate the light beams L in the sub-scanning direction of the scanning subjects 7.

Here, an incidence mechanism of the light beams incident on the polygon mirror of the light deflector will be described.

Figure 2A:
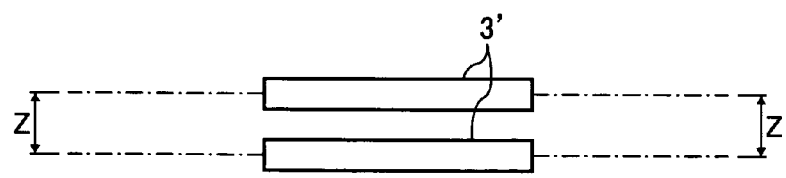
FIG. 2A is a diagram explaining a relationship between a conventional polygon mirror and light beams.
Figure 14A:
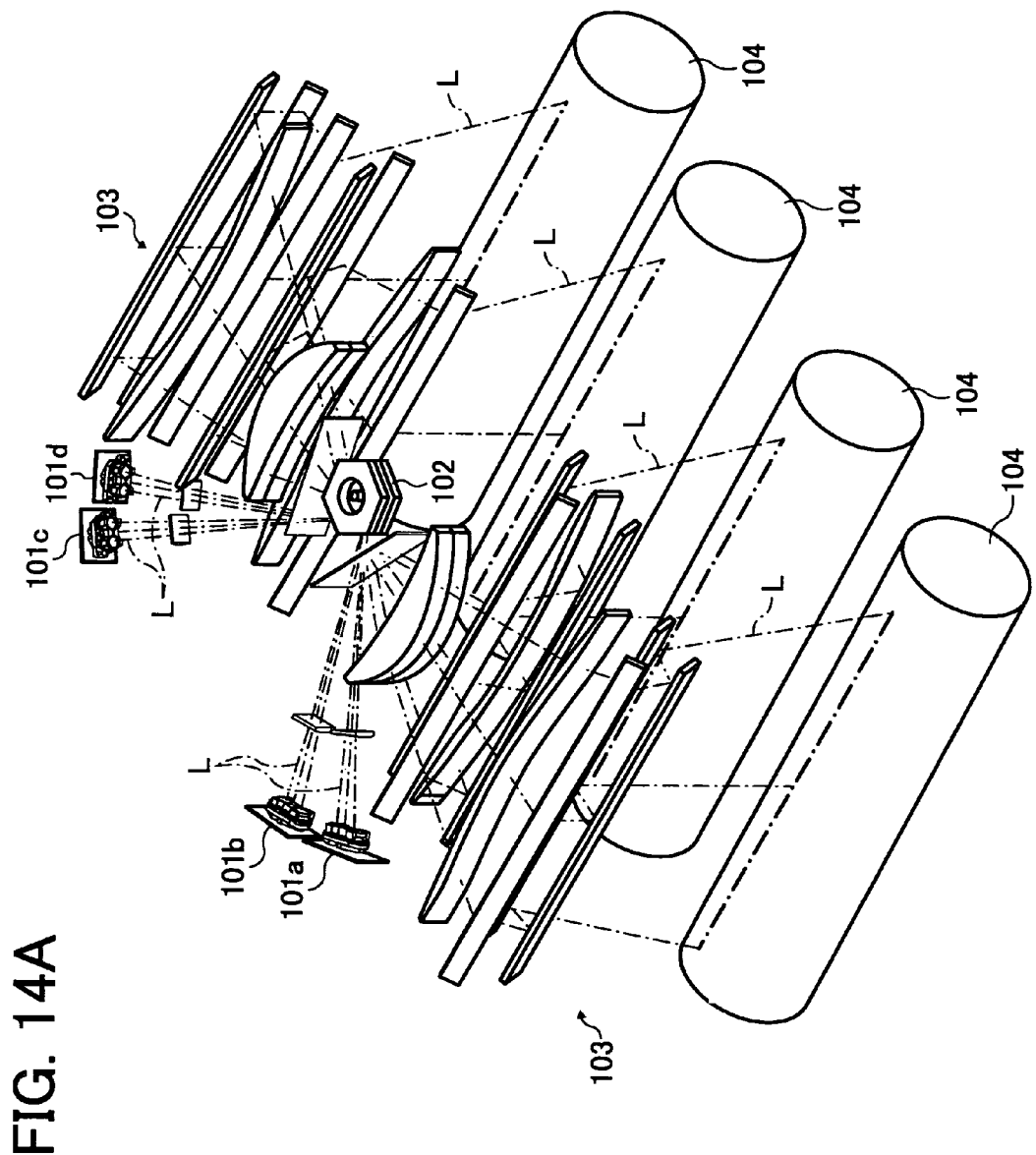
FIG. 14A is a perspective view of a configuration of a conventional tandem-type image forming device.
Figure 14B:
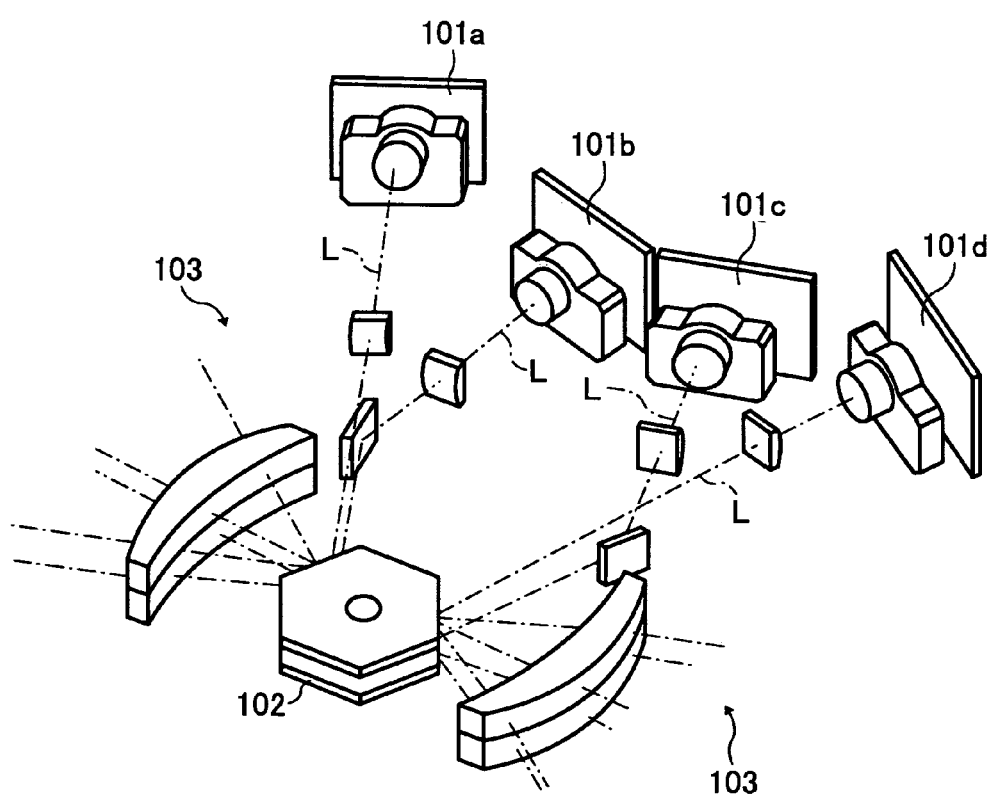
FIG. 14B is an enlarged perspective view of a main section of a light source periphery shown in FIG. 14A.

In a conventional optical scanning device shown in FIG. 14A and FIG. 14B, a polygon mirror 3' that is divided into two levels, an upper level and a lower level, is used to obtain a space Z required to separate the light beams L moving toward the different scanning subjects 7, as shown in FIG. 2A. The polygon mirror 3' can be used as one level, without being divided into two levels. However, thickness of the polygon mirror 3' becomes thick in the sub-scanning direction, and the configuration becomes unsuitable for speed increase and cost reduction.

At the same time, according to the embodiment, through use of an optical system having an oblique incidence method configuration, a deflective reflecting surface of the polygon mirror 3' itself is not required to provide the light beams L with predetermined spaces in the sub-scanning direction.

Figure 2B:
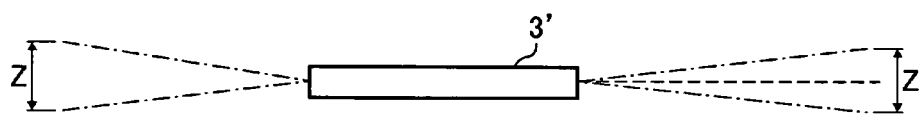
FIG. 2B and FIG. 2C are diagrams explaining a relationship between a polygon mirror and light beams according to the present embodiment.

In other words, as shown in FIG. 2B, a pair of light beams L from light source devices are incident on a differing reflecting surface of the same polygon mirror 3', from a left-hand direction and a right-hand direction in the diagram. The light source devices are at differing angles to a normal line of a reflecting surface of the polygon mirror 3' in the sub-scanning direction. As a result, a polyhedron forming the deflective reflecting surfaces of the polygon mirror 3' can serve as one level, and the thickness in the sub-scanning direction can be reduced. Inertia as a rotating body can be made small, and start-up time can be shortened. Furthermore, compared to a conventional, two-level polygon mirror 3' structure using an opposed-scanning method shown in FIG. 2A, cost can be reduced.

Figure 2C:

As shown in FIG. 2C, same effects can be achieved when all light beams L are incident on the deflective reflecting surface of the same polygon mirror 3'.

According to the embodiment, all light beams L moving toward the different scanning subjects 7 are at an angle to the normal line of the reflecting surface of the light deflector 3 or, in other words, at an angle in the sub-scanning direction. As a result, an optical scanning device that takes environment into consideration can be provided. For example, cost of the polygon mirror 3' making up a high percentage of cost among components included in the optical scanning device can be reduced, and power-consumption and noise can be reduced.

Issues regarding optical performance when an oblique incidence configuration is used will be described.

Compared to conventional horizontal incidence, in a configuration in which light beams are obliquely incident in the sub-scanning direction, as according to the embodiment, large scanning line curvature becomes an issue. An amount of scanning line curvature occurrence differs depending on an oblique incidence angle of each light beam L in the sub-scanning direction. For example, when the scanning subjects 7 are photoreceptors in a color image forming device, the scanning line curvature appears as a color shift when latent images drawn using each light beam L are superimposed and visualized using respective color toners. Oblique incidence causes the light beams L to be incident on the scanning lens in a twisted state. As a result, wavefront aberration increases, optical performance, particularly in peripheral image heights, is significantly degraded, and beam spot diameters on the scanning subjects are widened, thereby interfering with formation of higher-quality images.

Occurrence of the wavefront aberration and occurrence of the scanning line curvature in an oblique incidence optical system will be described.

For example, as long as a shape in the sub-scanning direction of an incidence surface of the scanning lens included in the optical scanning system, particularly a scanning lens having a strong refracting power in the sub-scanning direction (the second scanning lenses (L2) in FIG. 1), is not a circular arc of which a center is the reflecting point of the light beams on the deflective reflecting surface, a distance from the deflective reflecting surface of the light deflector 3 to the incidence surface of the scanning lens differs depending on lens height in the main scanning direction. Ordinarily, giving the scanning lens the above-described shape is difficult in terms of maintaining optical performance. In other words, as shown in FIG. 1, ordinary light beams L are deflection-scanned by the light deflector 3. The light beams L have a certain incidence angle in the main scanning direction and are incident on a main scanning cross-section at each image height, without being incident perpendicular to the lens surface.

Because the light beams L that have been deflection-scanned by the light deflector 3 have a certain incidence angle in the sub-scanning direction (because the light beams L are obliquely incident), the distance from the deflective reflecting surface of the light deflector 3 to scanning lens incidence surface differs depending on image height. An incidence height in the sub-scanning direction of the light beams incident on the scanning lens becomes higher or lower (differs depending on a direction of the angles of the light beams in the sub-scanning direction) than the center towards the periphery. As a result, when the light beams L pass through a surface having refracting power in the sub-scanning direction, the refracting power applied in the sub-scanning section differs, and the scanning line curvature occurs. In the ordinary horizontal incidence, the light beams proceed horizontally to the scanning lens, even when the distance from the deflective reflecting surface to the scanning lens incidence surface differs. Therefore, incidence positions in the sub-scanning surface on the scanning lens do not differ, nor does the scanning line curvature occur. It goes without saying that the scanning line curvature occurs as described above if the lens has refracting power in the sub-scanning direction.

The wavefront aberration caused by oblique incidence will be described.

As described above, as long as the shape of the incidence surface of the scanning lens included in the optical scanning system in the sub-scanning direction is not a circular arc of which a center is the reflecting point of the light beams on the deflective reflecting surface, the distance from the deflective reflecting surface of the light deflector 3 to the incidence surface of the scanning lens differs depending on lens height. Ordinarily, giving the scanning lens the above-described shape is difficult in terms of maintaining optical performance. In other words, the ordinary light beams L are deflection-scanned by the light deflector 3. The light beams L have a certain incidence angle in the main scanning direction and are incident on the main scanning cross-section at each image height, without being incident perpendicular to the lens surface.

The light bundle of the light beams that are deflection-scanned by the light deflector has a certain width in the main scanning direction. The light beams on both ends in the main scanning direction within the light bundle have differing distances from the deflective reflecting surface of the light deflector 3 to the scanning lens incidence surface and are at an angle in the sub-scanning direction (because the light beams are obliquely incident). Therefore, the light beams are incident on the scanning lens in a twisted state. As a result, the wavefront aberration is significantly deteriorated and the beam spot diameter widens. As shown in FIG. 1, the incidence angle in the main scanning direction becomes smaller toward the peripheral image height. The incidence positions in the sub-scanning direction of the light beams on both sides in the main scanning direction of the light beams incident on the scanning lens are significantly shifted. As a result, the light beams become increasingly twisted, and the widening of the beam spot diameter caused by the deterioration of the wavefront aberration increases toward the periphery.

According to the embodiment, the special surface of the lens is used to perform wavefront aberration correction. More specifically, the incidence surface of the shared lens (the first scanning lens (L1) 4 according to the embodiment) is the special surface. The special surface includes the surface of which the curvature in the sub-scanning direction changes depending on the main scanning direction. In addition, the special surface includes the surface of which the negative refracting power becomes stronger toward the periphery of the surface in the main scanning direction. The wavefront aberration correction is performed using the special surface.

The shared lens (the first scanning lens (L1) 4) according to the embodiment will be described.

The use of the shared lens has following advantages. When the scanning lenses are provided for each light beam L moving toward the scanning subjects 7, the number of scanning lenses can be reduced, thereby providing an inexpensive optical scanning device. Furthermore, in the oblique incidence optical system, when the scanning lens is not shared but, rather, two levels are placed one upon the other, the space in the sub-scanning direction between the light beams L is required to be wide. Therefore, the oblique incidence angle increases, and the occurrences of the deterioration of the wavefront aberration and the scanning line curvature increase. However, the increase in the occurrences of the deterioration of the wavefront aberration and the scanning line curvature can be controlled.

According to the embodiment, the light beams L moving toward the different scanning subjects 7 share the first scanning lens (L1) 4 provided close to the polygon mirror 3. The oblique incidence angle is set to a minimum. As a result, the occurrences of the wavefront aberration and the scanning line curvature can be controlled. The wavefront aberration can be corrected on the optical surface. However, the amount of correction can be further reduced.

In an opposed-scanning method for setting the oblique angle to a small angle, reduction of the number of light beams sharing the shared lens is effective in reducing the oblique angle. However, the number of scanning lenses can be minimized by all light beams sharing the shared lens, thereby effectively reducing cost. Either method can be selected depending on specifications required of the optical scanning device. Particularly in the optical surface described hereafter, the higher the position in the sub-scanning direction in which the light beams are incident, the more easily the deflection in the sub-scanning direction required for wavefront aberration correction can be set on the same surface, thereby being effective in a one-side scanning system having a lens shared by all light beams.

When the scanning lens is not shared, scanning lenses corresponding to each light beam from different light source devices or, in other words, each light beam moving toward different photoreceptors, are required to be arranged in the sub-scanning direction and disposed. In the opposed-scanning method, the scanning lenses are required to be placed upon each other in at least two levels. In the one-sided scanning method, the scanning lenses are required to be placed upon each other in at least four levels. At this time, a rib is required outside of an effective range of lens surfaces corresponding to each light beam. The distance between light beams adjacent in the sub-scanning direction widens. The oblique angle increases, and the deterioration of the optical performance increases.

To widen the space between adjacent light beams without changing the incidence angle, the scanning lenses are required to be separated from the light deflector. In addition, the refracting power particularly in the main scanning direction is required to be strengthened. As a result, the thickness of the lens increases, the scanning lens increases in size, and cost increases. Furthermore, issues occur during assembly, such as in an adhesion step for fixing overlapping lenses and when performing an accurate positioning.

A number of components can be reduced by the shared scanning lens being integrally formed, thereby minimizing disparity between components. For example, in the one-sided scanning method, the number of scanning lenses can be significantly reduced by all light beams that are moving toward the photoreceptors serving as respective scanning-subject surfaces corresponding to cyan, magenta, yellow, and black in the color image forming device sharing a single lens.

In the opposed-scanning method, the number of scanning lenses can be reduced by the light beams of two colors sharing a scanning lens. In other words, disparity in component tolerance can be reduced among the light beams corresponding to each color. An optical performance that is stable between each color can be acquired.

According to the embodiment, the first scanning lens (L1) 4 serves as the shared lens. The light beams L pass in the sub-scanning direction of the shared lens without passing through the reference axis a. As a result, the wavefront aberration can be corrected through an effect of the special surface (optical surface) described hereafter.

The wavefront aberration correction using the special surface will be described.

As described earlier, the incidence angle in the main scanning direction of the light beams incident on the scanning lens becomes smaller toward the peripheral image height, and the twist in the light beam increases. The widening of the beam spot diameter caused by the deterioration of the wavefront aberration increases toward the peripheral image height.

The occurrence of the deterioration of the wavefront aberration increases by the light beams becoming twisted when the light beams are incident on a scanning lens having a strong refracting power, particularly in the sub-scanning direction.

Figure 3:
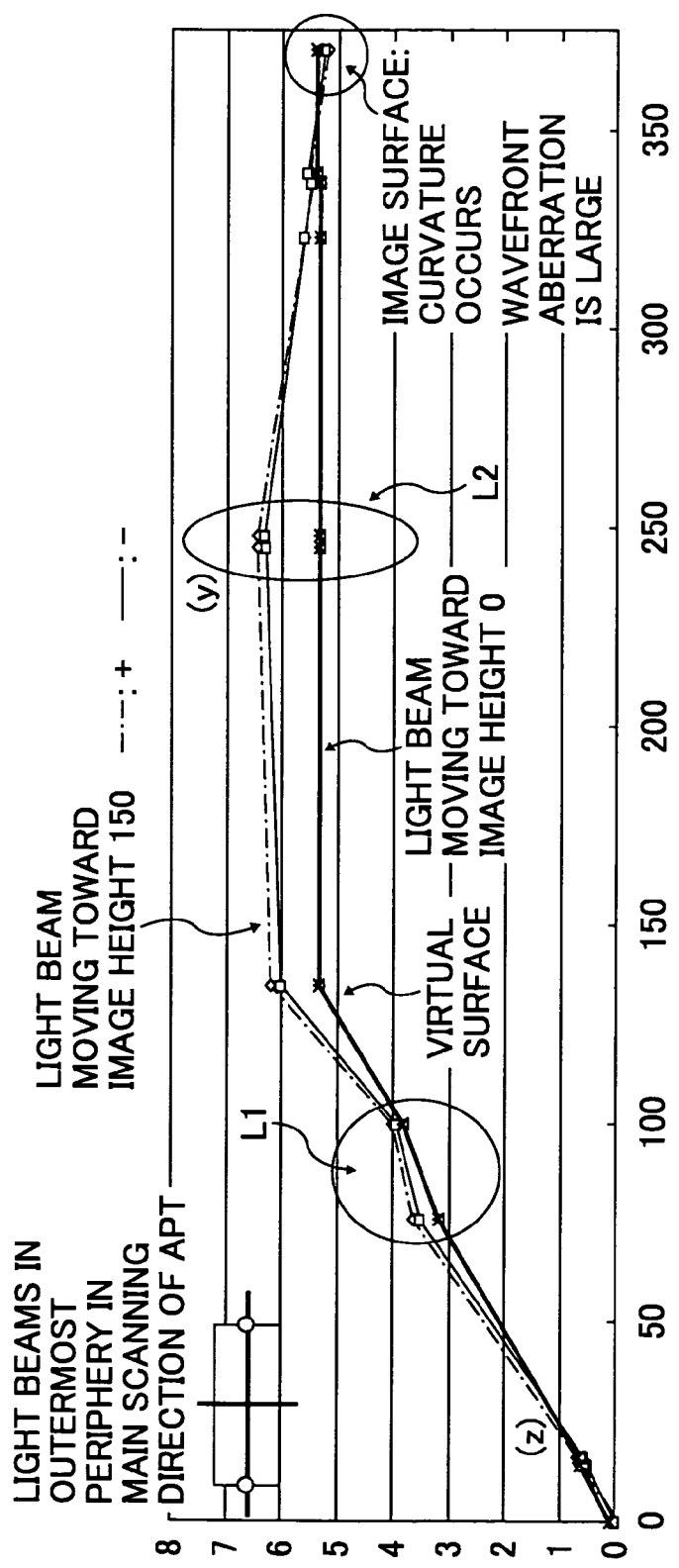
FIG. 3 is a diagram of light beams on a sub-scanning cross-section when the light beams are obliquely incident on a conventional optical scanning system (with no special surface)

FIG. 3 is a diagram of the light beams at a sub-scan cross-section when the light beams are obliquely incident on a conventional optical scanning system (with no special surface). The light beams shown in FIG. 3 are two light beams at both ends in the main scanning direction and at a center in the sub-scanning direction of an aperture disposed after the coupling lens.

L1 in FIG. 3 is the first scanning lens 4 in FIG. 1. L2 is the second scanning lens 5. The second scanning lens (L2) has a strong refracting power in the sub-scanning direction. A virtual surface in FIG. 3 does not actually exist. The virtual surface refers to a virtual mirror surface used to dispose the second scanning lens (L2) horizontally to the first scanning lens (L1) in the diagram.

As is clear in FIG. 3, each light beam (z section) reflected by the light deflector is incident on the first scanning lens (L1) at differing heights in the sub-scanning direction. At center image height, the light beam is almost vertically incident on the first scanning lens (L1). Therefore, each light beam is incident on the first scanning lens (L1) without differing heights in the sub-scanning direction. As a result, a favorable beam spot diameter can be maintained without deterioration of the wavefront.

At the same time, at the peripheral image height (here, a light beam reaching a +150 mm-position on the scanning-subject surface), incidence height of each light beam (y section) differs in the sub-scanning direction because of differences in light paths from the light deflector to the second scanning lens (L2). As a result, each light beam is not concentrated at one point on the scanning-subject surface after being emitted from the second scanning lens (L2). In other words, the wavefront aberration is in a deteriorated state, and the beam spot diameter is deteriorated.

To correct the wavefront aberration, the incidence height of the light beam incident on the second scanning lens (L2) having the strong refracting power in the sub-scanning section is required to be corrected, and the light beams are required to be concentrated at one point on the scanning-subject surface. Therefore, the special surface used to perform the wavefront aberration is preferably provided in a lens closer to the light deflector side than the scanning lens having the strongest refracting power in the sub-scanning direction.

Figure 4:
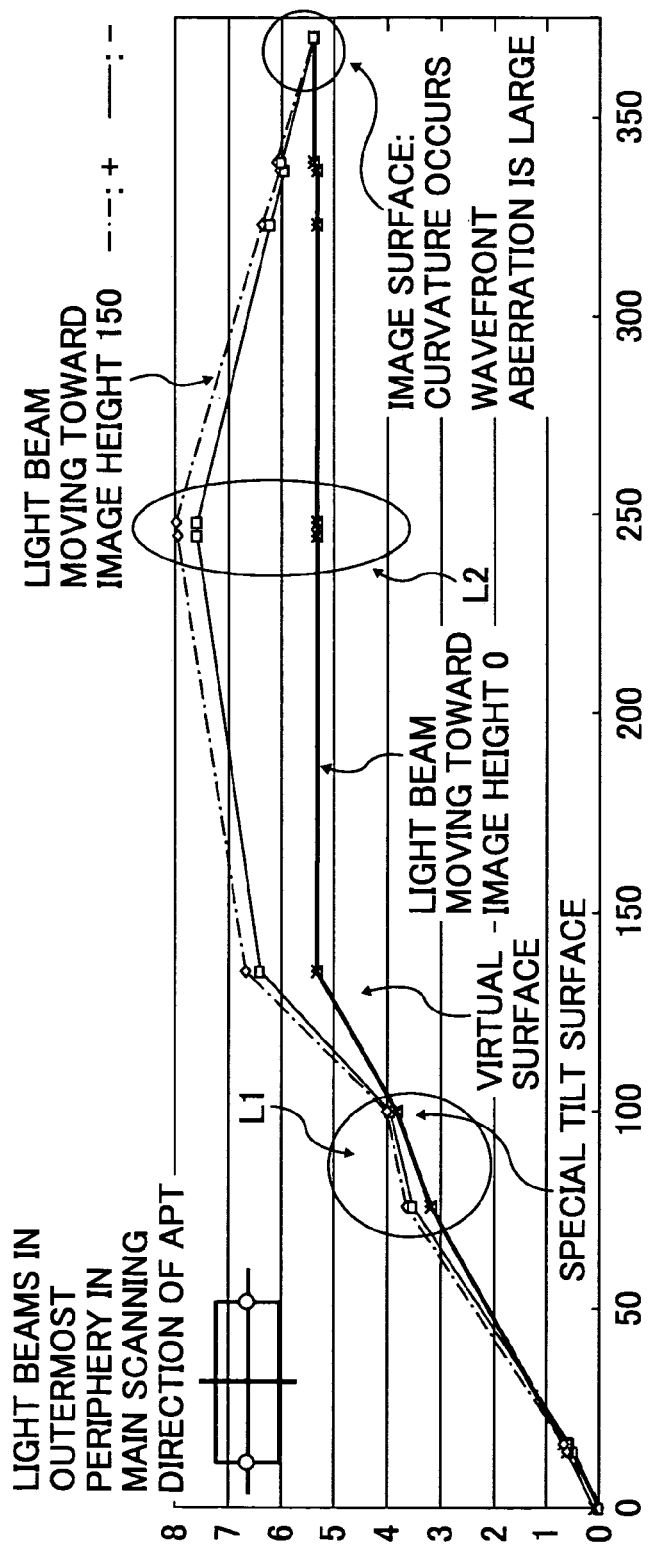
FIG. 4 is a diagram of the light beams on the sub-scanning cross-section when the light beams are obliquely incident on an optical scanning system according to the embodiment (with special surface)

Specifically, as shown in FIG. 4, peripheral light beams are raised at the first scanning lens (L1) and incident at a high position on the second scanning lens (L2). As a result, the deterioration of the wavefront aberration (twisting of the light beams) can be corrected, and each light beam can be concentrated at one point on the scanning-subject surface. In an example shown in FIG. 4, the scanning line curvature is also corrected by the use of a surface described hereafter (second scanning lens (L2)).

Effects of the special surface will be described.

The special surface is the surface of which the curvature in the sub-scanning direction changes depending on the main scanning direction and the surface of which the negative refracting power becomes stronger toward the periphery of the surface in the main scanning direction. The special surface is expressed by Equation (1). However, the content of the present invention is not limited to a shape-equation below. A same surface shape can be identified using a different shape-equation.

A near-axis radius of curvature within the "main scanning cross-section" that includes the optical axis and is a plane cross-section in the main scanning direction is RY. A distance from the optical axis in the main scanning direction is Y. High order coefficients are A, B, C, D . . . . A near-axis radius of curvature within the "sub-scanning cross-section" perpendicular to the main scanning cross-section is RZ.

$$X(Y, Z) = \frac{Y^2 \cdot Cm}{1 + \sqrt{[1 - (1+K) \cdot (Y \cdot Cm)^2]}} + A \cdot Y^4 + B \cdot Y^6 + C \cdot Y^8 + D \cdot Y^{10} + E \cdot Y^{12} \ldots + \frac{Cs(Y) \cdot Z^2}{1 + \sqrt{[1 - (Cs(Y) \cdot Z)^2]}} \quad (1)$$

where, $Cm = 1/RY$ $C_s(Y) = 1/RY + aY + bY^2 + cY^3 + dY^4 + eY^5 + fY^6 + gY^7 + hY^8 + iY^9 + jY^{10}$ According to the embodiment, the special surface is used in the incidence surface of the first scanning lens (L1) 4. Because of the surface of which the curvature in the sub-scanning direction changes depending on the main scanning direction and the surface of which the negative refracting power becomes stronger toward the periphery of the surface in the main scanning direction, passing light beams move toward a main scanning direction periphery and the light beams can be raised in the sub-scanning direction.

As a result, as described above, the incidence height in the sub-scanning direction of the light beam incident on the second scanning lenses (L2) 5 having the strong refracting power in the sub-scanning direction can be adjusted. The wavefront aberration correction can be successfully performed.

When the wavefront aberration correction is performed by the incidence position of the light beam incident on the second scanning lens (L2) 5 being changed, as described above, only an imaging position changes in a configuration in which the light beams pass through the optical axis (reference axis a) of the special surface of the first scanning lens (L1) 4. The adjustment of the incidence height in the sub-scanning direction of the light beam incident on the second scanning lens (L2) 5 is difficult to perform. Therefore, a' traveling path of the light beam can be deflected by a use of curvature change in the sub-scanning direction to the main scanning direction of the special surface and by the light beams not passing through the reference axis a. The light beams can share the same first scanning lens (L1) 4 having the special surface. Therefore, the number of scanning lenses can be reduced and cost can be reduced.

In other words, in the special surface of the first scanning lens (L1) 4, the light beam is required pass off-axis of the reference axis a. Because the special surface is used in the first scanning lens (L1) 4 that is the shared lens, the wavefront aberration that is an issue in the oblique incidence optical system can be corrected. Furthermore, a compact optical system and an inexpensive optical system can be achieved. Moreover, because the number of lenses is reduced, influence from component disparity can be reduced, and a stable optical performance can be obtained.

Effects achieved by the special surface being disposed on the incidence side will be described.

Figure 5A:
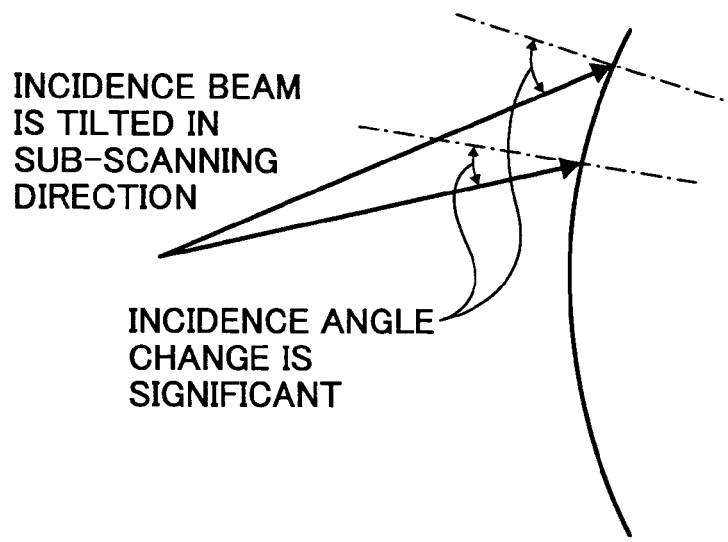
FIG. 5A and FIG. 5B are diagrams explaining incidence light beam states of light beams incident on a second scanning lens (L2)

When the special surface is used, the special surface can be set on either the incidence surface or an exit surface of the first scanning lens (L1) 4 to set the incidence height in the sub-scanning direction of the light beam incident on the second scanning lens (L2) 5 to an optimum height for the wavefront aberration correction However, when the special surface is used on the exit surface, the exit surface in the sub-scanning direction is required to be shaped so that a convex surface is facing the light deflector side to allow the exit surface to have a negative refracting power (to shape the surface so that the light beam is raised in the main-scanning direction periphery). When the light rays incident on the first scanning lens (L1) 4 are incident on the special surface formed on the exit surface, the incidence angle increases, as shown in FIG. 5A. When the angle of the light beam in the sub-scanning direction changes because of influences from component assembly, form error, or the like, the change in the incidence angle also increases.

Because the incidence angle significantly changes even if the incidence height in the sub-scanning direction of the light beam incident on the second scanning lens (L2) 5 is set to the optimum height during planning, an emission angle also changes. Therefore, the incidence height in the sub-scanning direction of the light beam incident on the second scanning lens (L2) 5 significantly changes. In other words, the wavefront aberration that is successfully corrected during planning is significantly deteriorated because the influences from component assembly, form error, or the like cause the angle of the light beam in the sub-scanning direction to change. As a result, maintaining a stable optical performance becomes difficult. Specifically, the variations in the beam spot diameters among image heights increase and image quality is degraded.

Figure 5B:
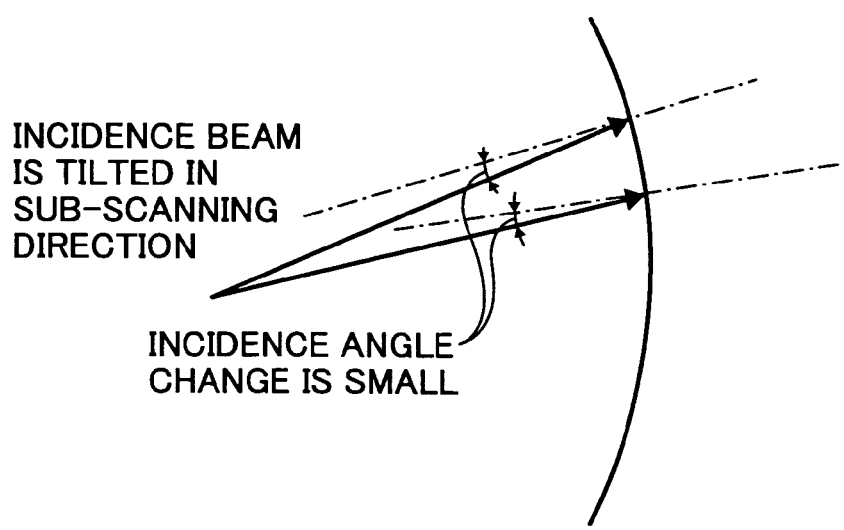

At the same time, when the special surface is used on the incidence surface as according to the embodiment, the incidence surface in the sub-scanning direction is required to be shaped so that a convex surface is facing an image surface side to allow the incidence surface to have the negative refracting power (to shape the surface so that the light beam is raised in the main-scanning direction periphery). In this case, when the angle of the light beam in the sub-scanning direction changes because of the influence from component assembly, form error, or the like, the change in the incidence angle is small, as shown in FIG. 5B. If the incidence height in the sub-scanning direction of the light beam incident on the second scanning lens (L2) 5 is set to an optimum height during planning, the changes in the emission angle is also small. The changes in the incidence height in the sub-scanning direction of the light beam incident on the second scanning lens (L2) 5 can be kept to a minimum.

In other words, even when the influence from component assembly, form error, or the like causes the angle in the sub-scanning direction to change after the wave aberration has been successfully corrected during planning, the light beam is favorably maintained, and a stable optical performance can be achieved. Specifically, image quality can be favorably maintained without the variations in the beam spot diameters among image heights fluctuating.

On a surface excluding the special surface used for wave aberration correction, the same special surface can be used for field curvature correction. In this case, the special surface is required to have a positive refracting power.

According to the embodiment, a scanning lens with a two-lens structure is given as an example and described. However, same effects can be obtained using a single-lens structure if the special surface is provided on the light deflector side, rather than on the surface having the strongest refracting power in the sub-scanning direction.

By the special surface being formed on the scanning lens near the light deflector, light bundle width in the main scanning direction is particularly wide. Therefore, the shape of the special surface can be successfully set and the wavefront aberration can be successfully corrected. The angle of the light beam in the sub-scanning direction is required to be deflected to correct the wavefront aberration.

As described earlier, if the width of the light beam is narrow when the correction (the deflection in the sub-scanning direction of the light beam) is performed using the special surface, the correction becomes difficult. In other words, a direction of the light beam can be changed even if the special surface is used in a position in which the light bundle width in the main scanning direction becomes narrow or, in other words, near a scanning-subject medium. However, deflection of the light beam in the sub-scanning direction is difficult.

Therefore, the light beams most preferably share the scanning lens closest to the light deflector, and the special surface is most preferably used on the incidence surface of the scanning lens to actualize a successful wavefront aberration correction, a stable optical performance, and an inexpensive optical scanning device.

Next, the optical scanning device according to a second embodiment of the present invention will be described.

The refractive power in the sub-scanning direction on the reference axis of the special surface is preferably zero or near zero.

When the incidence surface of the scanning lens that is the special surface has the negative refracting power, a convex surface of the lens faces an image surface side. In other words, viewed from the incidence side, the lens surface is concave in the sub-scanning direction. The light beams incident on the scanning lens are divergent rays. The light beams reflected on the incidence surface may be concentrated and returned to the deflective reflecting surface of the polygon mirror. The light beams may be further reflected by the deflective reflecting surface and may reach the scanning-subject surface. The light beams may degrade the image quality as ghost light.

Therefore, if the refractive power in the sub-scanning direction near the reference axis of the special surface is zero, the light beams reflected by the special surface are incident on the deflective reflecting surface of the light deflector as divergent rays. Furthermore, the light beams are obliquely incident. Therefore, the light beams are reflected to an outer side in the sub-scanning direction by the deflective reflecting surface of the light deflector. As a result, the light beams being concentrated on the scanning-subject surface and degrading the image quality as the ghost light can be reduced.

The special surface changes to a concave surface toward a periphery in the main scanning direction, when viewed from the incidence side. Because the light beams moving toward the periphery are incident on the special surface at an angle in the main scanning direction, the reflected light does not move toward the deflective reflecting surface of the light deflector. According to the present embodiment, the reflected light moves to the outer side of the light deflector 3, as shown in FIG. 6A and FIG. 6B. As a result, the ghost light is not easily formed on the scanning-subject surface, and the degradation of the image quality can be reduced.

Components in FIG. 6A that correspond to the components described in FIG. 1 are given the same reference numbers. Explanations thereof are omitted. FIG. 6B is a diagram of a main section in FIG. 6A viewed from a front side.

The deterioration of the wavefront aberration caused by the light beams being incident at an angle in the sub-scanning direction is extremely small because skew rays barely occur in the scanning lens near the optical axis. Therefore, the refractive power in the sub-scanning direction on the optical axis or near the optical axis of the special surface can be set to zero or near zero.

Next, the optical scanning device according to a third embodiment of the present invention will be described.

The scanning line curvature that is another issue of the oblique incidence optical system can be corrected-using the scanning lens (the second lens (L2) 5 according to the embodiment) disposed for each light beam moving toward the different scanning subjects after passing through the shared lens (the first lens (L1) 4 according to the embodiment).

For example, the scanning lenses disposed for each light beam moving toward the different scanning-subjects can be shifted and decentered in the sub-scanning direction. Alternatively, the scanning lenses can be tilted and decentered. As a result, the scanning line curvature can be improved. The occurrence of the scanning line curvature has been described above. Therefore, explanations thereof will be omitted.

According to the embodiment, in FIG. 1, at least one surface of the second lens (L2) 5 disposed for each light beam L emitted from the light source devices is a surface in which an amount of shifting and decentering in the sub-scanning direction differs in the main scanning direction. As a result, image point positions in the main scanning direction or, in other words, at each image height, can be corrected in the sub-scanning direction, and the scanning line curvature can be corrected.

Because the surface is that in which the amount of shifting and decentering in the sub-scanning direction differs in the main scanning direction, a traveling path of the light beam L can be changed to the sub-scanning direction. In other words, by shifting and decentering in the sub-scanning direction being appropriately performed in the main scanning direction, the light beams L that are used to perform the scan in the main scanning direction can be deflected to a desired direction (sub-scanning). As a result, the scanning line curvature can be corrected.

The surface for correcting the scanning line curvature is preferably used in the-scanning lens closest to the scanning subject (the second lens (L2) 5 according to the embodiment)-. As the light beam moves closer to the scanning-subject surface, a size (light bundle diameter) becomes smaller. Therefore, even when a traveling direction of the light beam is changed to correct the scanning line curvature, an effect on the light beam is small. Deterioration of a state in which the wave aberration has been corrected using the special surface of the scanning lens closest to the light deflector (the first scanning lens (L1) 4 according to the embodiment) can be prevented (the light beam after correction is not significantly skewed nor does the light beam disturb a wavefront).

In other words, to correct the wavefront aberration, a scanning lens provided close to the light deflector is effective. The scanning lens provides a large light bundle diameter and facilitates the correction of the traveling direction of the light beam.

Furthermore, in the scanning lens close to the scanning subject, the light beams moving toward each image height are further separated and few adjacent light beams overlap. Therefore, the amount of shifting and decentering in the sub-scanning direction can be set in detail. The scanning line curvature can be successfully corrected.

As an example of a shape of the surface used to correct the scanning line curvature, a surface shape that satisfies a following shape-equation (Equation (2)) can be considered.

A near-axis radius of curvature within the "main scanning cross-section" that includes the optical axis and is a parallel plane cross-section in the main scanning direction is RY. A distance from the optical axis in the main scanning direction is Y. High order coefficients are A, B, C, D . . . . A near-axis radius of curvature within the "sub-scanning cross-section" perpendicular to the main scanning cross-section is RZ.

$$X(Y, Z) = \frac{Y^2 \cdot Cm}{1 + \sqrt{[1 + (1 + K) \cdot (Y \cdot Cm)^2]}} + A \cdot Y^4 + B \cdot Y^6 + C \cdot Y^8 + \quad (2)$$

$$D \cdot Y^{10} + E \cdot Y^{12} \ldots + \frac{Cs(Y) \cdot [Z - Z0(Y)^2]}{1 + \sqrt{[1 - Cs(Y)^2 \cdot (Z - Z0(Y))^2]}} +$$

$$(F0 + F1 \cdot Y + F2 \cdot Y^2 + F3 \cdot Y^3 + F4 \cdot Y^4 + \ldots)Z$$

where, $$Cm = 1/RY$$

$$C_s(Y) = 1/RZ + aY + bY^2 + cY^3 + dY^4 + eY^5 + fY^6 + gY^7$$

$$Z0(y) = D0 + D1 \cdot Y + D2 \cdot Y^2 + D3 \cdot Y^3 + D4 \cdot Y^4$$

In Equation 2, $(F0 - F1 \cdot Y + F2 \cdot Y^2 + F3 \cdot Y^3 + F4 \cdot Y^4 + \ldots)$ Z indicates an amount of tilting. When there is no amount of tilting, F0, F1, F2, etc., are all zero. When F1, F2, etc., are not zero, the amount of tilting changes in the main scanning direction.

$D0 + D1 \cdot Y + D2 \cdot Y^2 + D3 \cdot Y^3 + D4 \cdot Y^4 + \ldots$ indicates an amount of shifting in the sub-scanning direction. When there is a D coefficient, the amount of shifting changes in the main scanning direction.

$C_s(Y) = 1/RZ + aY + bY^2 + cY^3 + dY^4 + eY^5 + fY^6 + gY^7 + \ldots$ means that a curvature in the sub-scanning direction changes to the main scanning direction.

However, when a sub-scanning shape is planar, the shape of the surface does not change even when shifting and decentering is performed (even when D coefficients are set).

In this way, in the optical scanning device configured according to the embodiment, at least one surface of the lens disposed for each light beam emitted from the light source devices is the surface in which the amount of shifting and decentering in the sub-scanning direction differs in the main scanning direction. As a result, the scanning line curvature can be successfully corrected.

Next, the optical scanning device according to a fourth embodiment of the present invention will be described.

The scanning line curvature correction according to the fourth embodiment will be described. The scanning line curvature can be more successfully corrected by a use of a surface that does not have the refracting power in the sub-scanning direction and in which the amount of tilting and decentering in the sub-scanning direction differs in the main scanning direction (hereinafter, referred to as a special tilt surface), in place of a mother line curved surface in the scanning lens.

By the amount of tilting and decentering in the sub-scanning direction being changed to the main scanning direction, the traveling path of the light beam can be changed to the sub-scanning direction. By the amount of tilting being made to differ in the main scanning direction and being optimally provided, the light beams L that are used to perform the scan in the main scanning direction can be deflected to the desired direction (sub-scanning). As a result, the scanning line curvature can be corrected. As in the mother line curved surface described according to the third embodiment, the special tilt surface is also preferably used in the scanning lens closest to the scanning subject for the same reasons explained above.

As an example of a shape of the special tilt surface, a surface shape that satisfies a following shape-equation (Equation (3)) can be considered.

A near-axis radius of curvature within the "main scanning cross-section" that includes the optical axis and is a parallel plane cross-section in the main scanning direction is RY. A distance from the optical axis in the main scanning direction is Y. High order coefficients are A, B, C, D . . . . A near-axis radius of curvature within the "sub-scanning cross-section" perpendicular to the main scanning cross-section is RZ.

$$X(Y, Z) = \frac{Y^2 \cdot Cm}{1 + \sqrt{[1 - (1 + K) \cdot (Y \cdot Cm)^2]}} + A \cdot Y^4 + B \cdot Y^6 + \quad (3)$$

$$C \cdot Y^8 + D \cdot Y^{10} + E \cdot Y^{12} \ldots + \frac{Cs(Y) \cdot Z^2}{1 + \sqrt{[1 - (Cs(Y) \cdot Z)^2]}} +$$

$$(F0 + F1 \cdot Y + F2 \cdot Y^2 + F3 \cdot Y^3 + F4 \cdot Y^4 + \ldots)$$

where, $$Cm = 1/RY, \quad Cs(Y) = 1/RZ$$

$(F0 + F1 \cdot Y + F2 \cdot Y^2 + F3 \cdot Y^3 + F4 \cdot Y^4 + \ldots)$ Z indicates the amount of tilting. When there is no amount of tilting, F0, F1, F2, etc., are all zero. When F1, F2, etc., are not zero, the amount of tilting changes in the main scanning direction.

Reasons for a shape of the special tilt surface in the sub-scanning direction being a planar shape having no curvature will be described.

When the special tilt surface has a curvature in the sub-scanning direction, the shape of the special tilt surface in the main scanning direction significantly changes at each height in the sub-scanning direction. When the incidence position of the light beam in the sub-scanning direction is shifted because of temperature fluctuation or an assembly error in an optical element, significant magnification error variations occur. In the color image forming device, light spot positions on the photoreceptor surface that is the scanning subject shift between colors, and color shift occurs.

According to the embodiment, the shape of the special tilt surface is planar, without any curvature. Therefore, the form error in the main scanning direction at each height in the sub-scanning direction is small. A magnification effort fluctuation that occurs when the incidence position of the light beam in the sub-scanning direction shifts can be reduced. As a result, the occurrence of color shift can be controlled.

In-practice, a main scanning shape changes depending on a height in the sub-scanning direction, through the use of the special tilt surface. However, the amount of change is minimal. Compared to when the surface has curvature in the sub-scanning direction, the change in the main scanning shape can be reduced. As a result, a difference in magnification fluctuations between the light beams caused by temperature distribution can be reduced. The color shift at an intermediate image height that occurs when a position at which writing is started and a position at which the writing is completed for each light beam match through synchronization can be reduced.

Figure 7A:
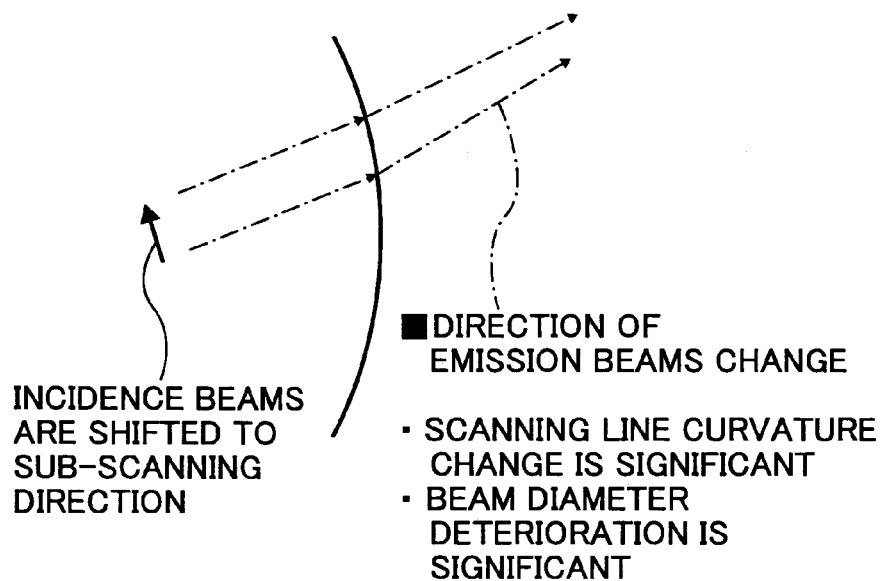
FIG. 7 is a diagram explaining incidence light beam states of light beams incident on a special tilted surface according to the embodiment.
Figure 7B:
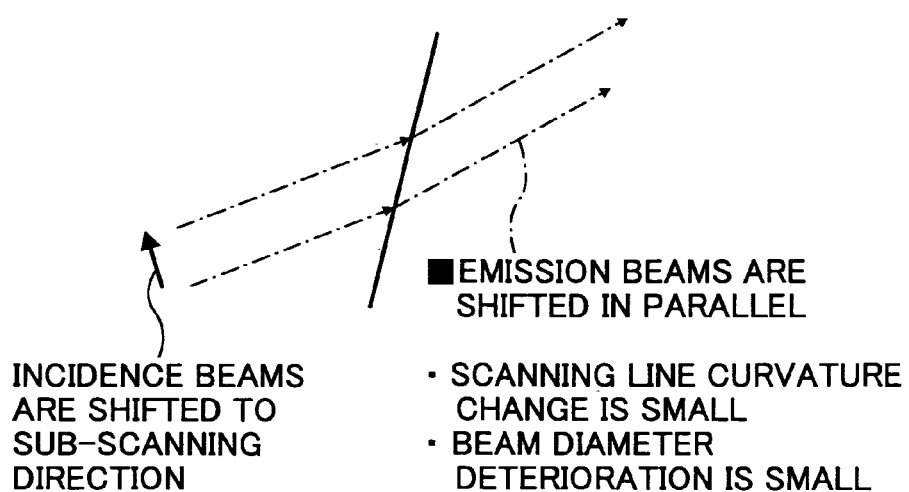

In addition, as shown in FIG. 7B, when the incidence light beam is shifted in the sub-scanning direction, the traveling direction of the light beam is also merely shifted because the special tilt surface does not have refracting power. The change in the direction is small. On the surface having the curvature in the sub-scanning direction or, in other words, on the surface having the refractive power, as shown in FIG. 7A, when the incidence light beam shifts in the sub-scanning direction, the refracting power changes, causing the traveling direction of the light beam to change. When the amount of change in the traveling direction differs at each image height, significant scanning line curvature occurs. In addition, the light beam becomes skewed, and the wavefront aberration and the beam spot diameter are deteriorated.

Because of the above-described reasons, the shape of the special tilt surface in the sub-scanning direction is required to be planar without any curvature.

In recent years, operations of the optical scanning device and the image forming device have become increasingly high in speed and density. When the polygon mirror is used as the light deflector, high-speed and high-density can be handled by the polygon mirror being rotated at a high speed. However, a number of rotations is limited. A method of achieving high speed and high density without increasing the number of rotations of the polygon mirror is required. Therefore, scanning a same scanning-subject surface using the light beams can be considered.

In the optical scanning device according to the present invention, the light source is, for example, preferably a semiconductor laser array having a plurality of luminous points or a multi-beam light source device using a plurality of light sources having a single luminous point or a plurality of luminous points. The light source uses a plurality of light beams to simultaneously scan a photoreceptor surface.

As a result, the light source can be applied to an optical scanning device and an image forming device achieving increased speed and density. Effects similar to those described earlier can be obtained when the optical scanning device and the image forming device are configured using the light source.

Figure 8A:
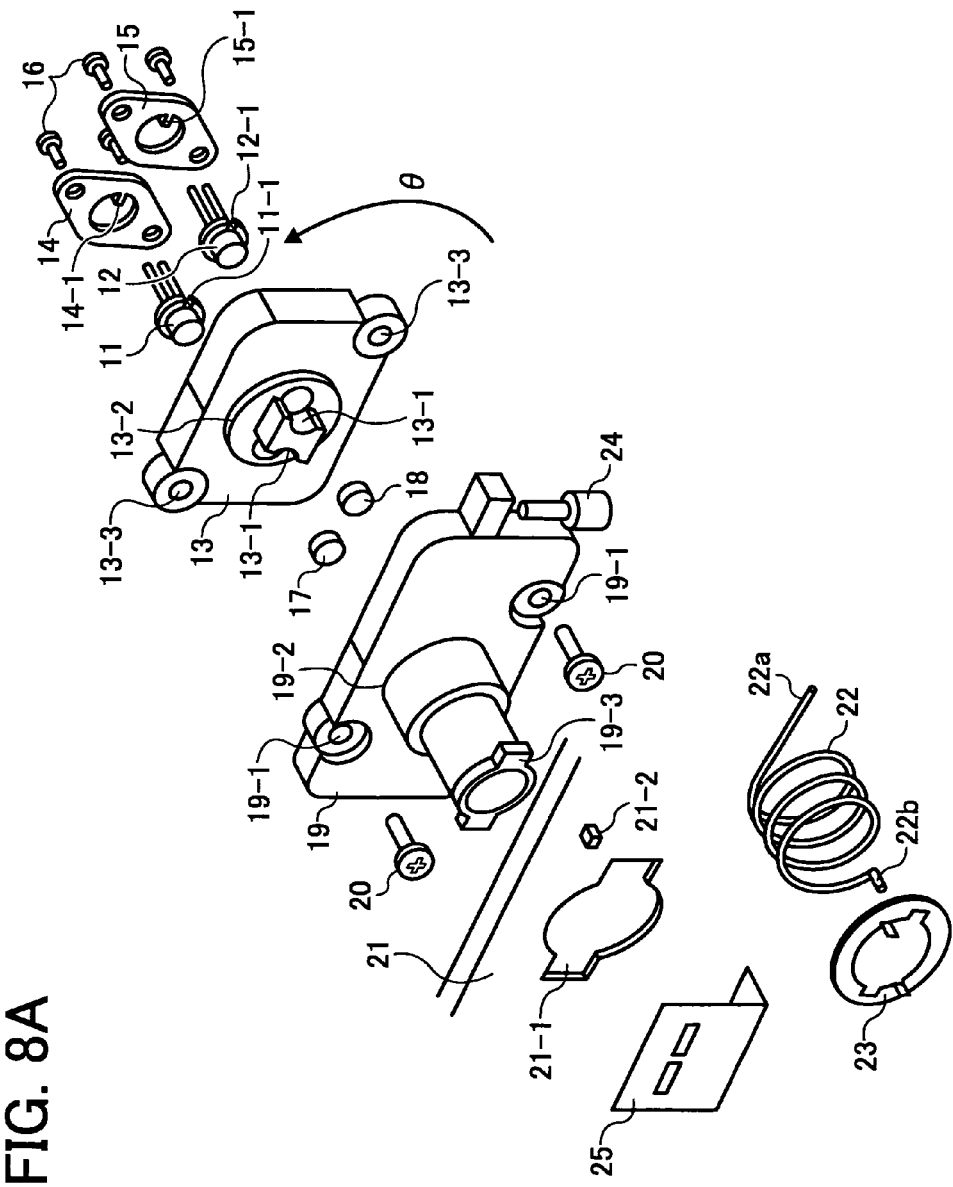
FIG. 8A to FIG. 8C are perspective views of a configuration of an example of a light source unit forming a multi-beam light source device that can be applied to the optical scanning device according to the embodiment.
Figure 8C:
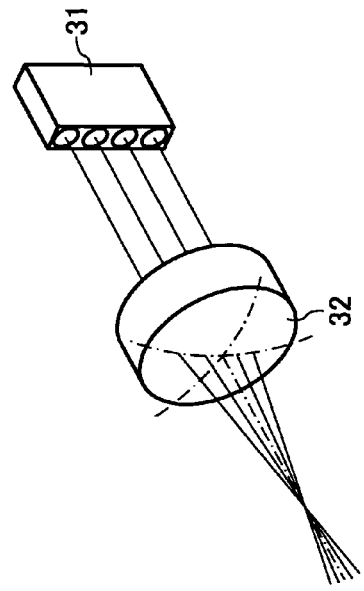
Figure 8B:
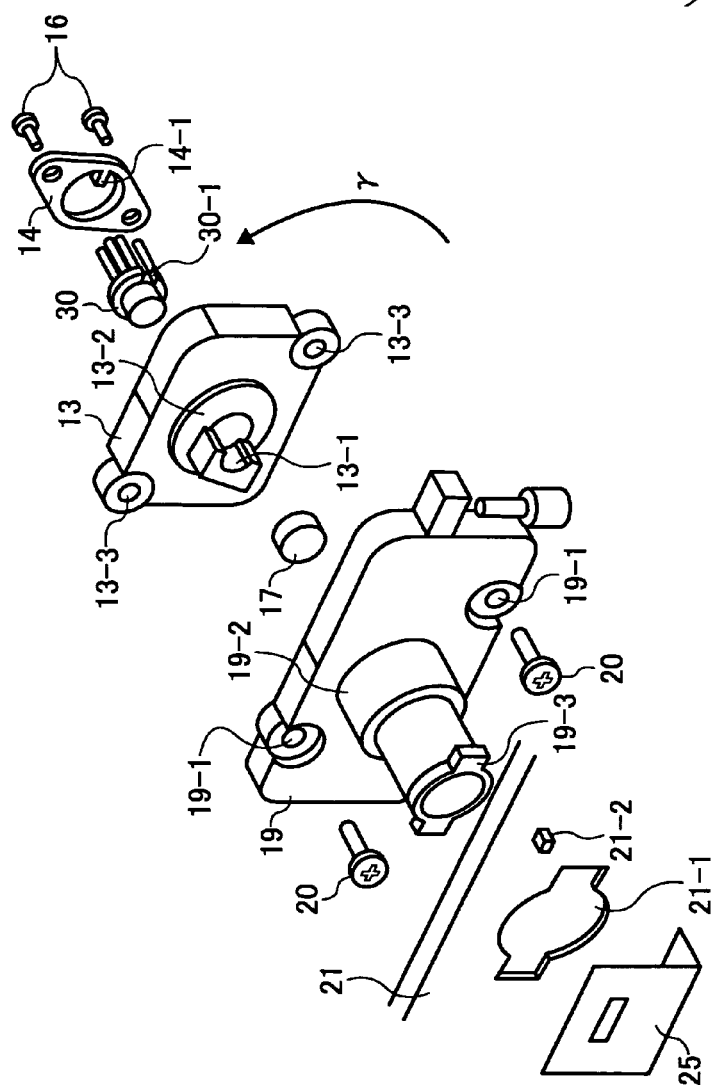

FIG. 8A to FIG. 8C are perspective views of a configuration of an example of a light source unit forming a multi-beam light source device that can be applied to the optical scanning device according to the embodiment.

In an exploded perspective view in FIG. 8A, a semiconductor laser 11 and a semiconductor laser 12 are individually fitted into respective engaging holes (not shown) formed on a backside of a base component 13. The engaging holes have a predetermined angle in the main scanning direction. According to the embodiment, the engaging holes are at a slight angle of about 1.5 degrees. The semiconductor laser 11 and the semiconductor laser 12 that are fitted into the engaging holes tilt by 1.5 degrees in the main scanning direction. Notches are formed on a cylindrical heat sink unit 11-1 of the semiconductor laser 11 and a cylindrical heat sink unit 12-1 of the semiconductor laser 12. A protrusion 14-1 formed in a circular center hole in a holding unit 14 is aligned with the notch on the heat sink unit 11-1. A protrusion 15-1 formed in a circular center hole in a holding unit 15 is aligned with the notch on the heat sink unit 12-1. As a result, an array direction of light-emitting sources is matched. Backsides of the holding unit 14 and the holding unit 15 are fixed to the base component 13 by screws 16. As a result, the semiconductor laser 11 and the semiconductor laser 12 are fixed to the base component 13.

A collimating lens 17 and a collimating lens 18 perform adjustment in an optical axis direction by outer circumferences of the collimating lens 17 and the collimating lens 18 being moved along semicircular attachment guide surfaces 13-1. The semicircular attachment guide surfaces 13-1 are provided as a pair on the base component 13. The collimating lens 17 and the collimating lens 18 are positioned and adhered so that the divergent beams emitted from the luminous points become parallel light beams.

According to the embodiment, the light beams respectively emitted from the semiconductor laser 11 and the semiconductor laser 12 are set so as to intersect on a main scanning surface. Therefore, the engaging holes and the semicircular attachment guide surfaces 13-1 are respectively formed at an angle along the light beam direction. A cylindrical engaging unit 13-2 of the base component 13 is engaged with a holder component 19. Screws 20 are screwed through through-holes 19-1 in the holder component 19 and screwed into screw holes 13-3 in the base component 13. As a result, the base component 13 is fixed to the holder component 19, forming the light source unit.

A cylinder unit 19-2 of the holder component 19 in the light source unit is engaged with a reference hole 21-1 formed on an attachment wall 21 of an optical housing. A spring 22 is inserted from a front side of the attachment wall 21. A stopper component 23 is engaged with cylinder unit projections 19-3 in the holder component 19. As a result, the holder component 19 is held close to the back side of the attachment wall 21, thereby holding the light source unit. One end 22a of the spring 22 is hooked onto a protrusion 21-2 on the attachment wall 21. Another end 22b of the spring 22 is hooked onto the stopper component 23 in the light source unit. As a result, a torque is generated in the light source unit. A central rotation axis of the torque is the cylinder unit 19-2 The light source unit includes an adjustment screw 24 used to control the torque. When the adjustment screw 24 is rotated, the entire light source unit is rotated in a θ direction that is a circumference of the optical axis, and a pitch can be adjusted.

An aperture 25 is disposed in front of the light source unit. The aperture 25 has slits respectively corresponding to the semiconductor laser 11 and the semiconductor laser 12. The aperture 25 is attached to an optical housing and regulates an emission diameter of the light beam.

FIG. 8B is an exploded perspective view of another example of the light source unit. The light source unit in FIG. 8B differs from the light source unit in FIG. 8A in that a semiconductor laser 30 having four light-emitting sources is provided. Each light beam emitted from the semiconductor laser 30 is synthesized using a beam synthesis unit. A notch is formed on a cylindrical heat sink unit 30-1 of the semiconductor laser 30. Other constituent elements are given the same reference numbers as the components described in FIG. 8A. Detailed descriptions thereof are omitted.

FIG. 8C is a diagram of an example in which light beams emitted from a semiconductor laser array 31 are synthesized using a beam synthesis unit. The semiconductor laser array 31 has four light-emitting sources. A configuration in FIG. 8C is based on the example shown in FIG. 8B. Other constituent elements are the same as those in FIG. 8A and FIG. 8B. Descriptions thereof are omitted.

Figures 9, 10:
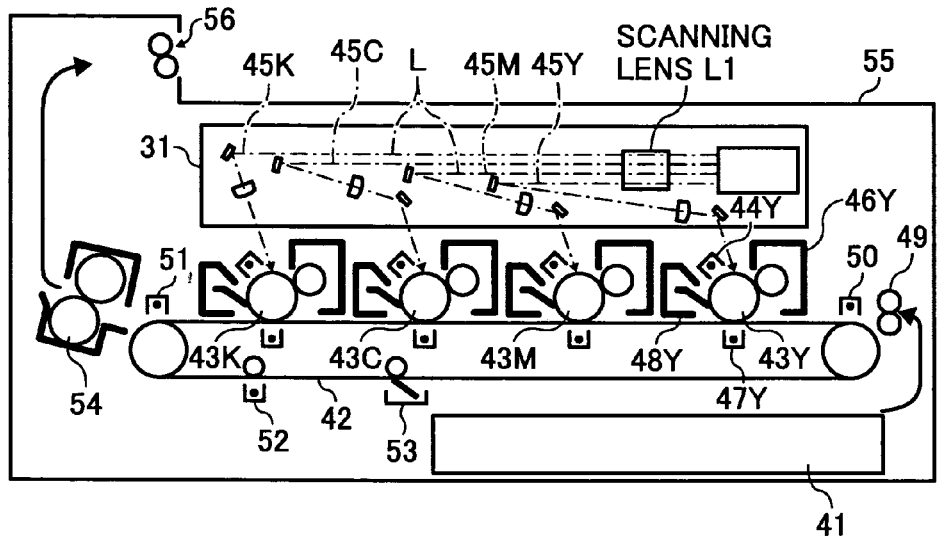
FIG. 9 is a schematic diagram of an image forming device according to an embodiment using the optical scanning device according to the present invention.
FIG. 10 is a diagram of optical data of the first scanning lens (L1) and the second scanning lens (L2) according to the embodiment.

FIG. 9 is a schematic diagram of the image forming device according to an embodiment including the optical scanning device according to the present invention. According to the embodiment, the optical scanning device according to the present invention is applied to a tandem-type full-color laser printer.

In FIG. 9, a carrying belt 42 is provided in a lower area of a main body of the image forming device. The carrying belt 42 carries a transfer paper (not shown) supplied from a paper supply cassette 41 disposed in a horizontal direction. A photoreceptor 43Y for yellow, a photoreceptor 43M for magenta, a photoreceptor 43C for cyan, and a photoreceptor 43K for black are sequentially disposed above the carrying belt 42 from an upstream end of a carrying direction in which the transfer paper is carried. The photoreceptor 43Y, the photoreceptor 43M, the photoreceptor 43C, and the photoreceptor 43K are equally spaced. The photoreceptor 43Y, the photoreceptor 43M, the photoreceptor 43C, and the photoreceptor 43K are image carriers having a same diameter. Processing components used to perform electrophotographic processing are sequentially disposed in a periphery of each photoreceptor. For example, a charger 44Y, an optical scanning system 45Y, a developing unit 46Y, a transfer charger 47Y, a cleaning unit 48Y, and the like are sequentially provided in the periphery of the photoreceptor 43Y. The processing components are similarly disposed in the peripheries of the photoreceptor 43M, the photoreceptor 43C, and the photoreceptor 43K.

According to the embodiment, surfaces of the photoreceptor 43Y, the photoreceptor 43M, the photoreceptor 43C, and the photoreceptor 43K are scanning-subject surfaces or irradiating-subject surfaces set to the respective colors. An optical scanning system 45Y, an optical scanning system 45M, an optical scanning system 45C, and an optical scanning system 45K have a one-to-one correspondence with the respective photoreceptors. However, as in the optical scanning device according to the present invention, the optical scanning system 45Y, the optical scanning system 45M, the optical scanning system 45C, and the optical scanning system 45K share the scanning lens L1.

Resist rollers 49 and a belt charger 50 are provided in a periphery of the carrying belt 42 higher up-stream than the optical scanning system 45Y. A belt separation charger 51, an anti-static charger 52, a cleaning unit 53, and the like are sequentially provided lower down-stream in a rotation direction of the carrying belt 42 than the optical scanning system 45K. A fixing unit 54 is provided lower down-stream in a transfer paper carrying direction that the belt separation charger 51. Paper discharging rollers 56 are provided so as to discharge the transfer paper towards a paper discharging tray 55 after fixing.

For example, when an image forming device configured in this way is set to full-color mode (multiple color mode), the light beams L are emitted from each optical scanning device 45Y, optical scanning device 45M, optical scanning device 45C, and optical scanning device 45K to each photoreceptor 43Y, photoreceptor 43M, photoreceptor 43C, and photoreceptor 43k, based on respective image signals for colors yellow, magenta, cyan, and black. The light beams L perform scanning and form electrostatic latent images corresponding to each color signal on the surfaces of each photoreceptor 43Y, photoreceptor 43M, photoreceptor 43C, and photoreceptor 43k. The electrostatic latent images are developed using color toner by the developing unit 46Y and the like corresponding to each photoreceptor and become toner images. The transfer charger 47Y and the like successively transfer the toner images onto the transfer paper carried by the carrying belt 42. The transferred toner images are superimposed and a full-color image is formed on the transfer paper. The full-color image is fixed by the fixing unit 54 and discharged by the paper discharging rollers 56 to the paper discharging tray 55.

The optical scanning system 45Y, the optical scanning system 45M, the optical scanning system 45C, and the optical scanning system 45K of the image forming device are configured as the optical scanning device according to the embodiments of the present invention. As a result, an image forming device that can effectively correct the scanning line curvature and the deterioration of the wave aberration and can ensure high-quality image reproduction without causing color shifts can be achieved.

Although a configuration example of the one-sided scanning method optical scanning device has been described according to the embodiment, a same configuration can be used in, for example, the opposed-scanning method optical scanning device.

An embodiment of the optical scanning device of the present invention will be described in detail. Constituent elements are described in correspondence with the configuration of the optical system shown in FIG. 1.

The semiconductor laser used as the light source has an emission wavelength of 780 nanometers. The emitted divergent light beams are essentially converted to parallel light beams by the coupling lens 1 (focal distance of 10 millimeters). Because of an effect of the cylinder lens 2 (focal distance of 125 mm), the parallel light beams form a line image that is long in the main scanning direction in a position on the deflective reflecting surface of the light deflector 3. The light deflector 3 includes six deflective reflecting surfaces of the polygon mirror and has an inscribed circle diameter of 13 millimeters.

The rotation axis and the deflective reflecting surface of the light deflector 3 are formed in parallel. The light beams are obliquely incident on the deflective reflecting surface by an angle of 3.3 degrees and 1.46 degrees in the sub-scanning direction. In the main scanning direction, the light beams moving toward image height zero are incident at approximately an angle of 60 degrees. The aperture regulating the light beams emitted from the coupling lens 1 is a rectangular aperture that is 4.7 millimeters in the main scanning direction and 1.06 millimeters in the sub-scanning direction.

The first scanning lens (L1) 4 and the second scanning lenses (L2) 5 are configured based on data shown in FIG. 10 to FIG. 12.

The first scanning lenses (L1) 4 indicated by surface number 1 and surface number 2 are disposed in parallel on the deflective reflecting surface (the light beams are obliquely incident on the lens at a ±3.3 degrees and a ±1.46 degrees).

The second scanning lenses (L2) 5 indicated by the surface number 3 and 4 are disposed so that the optical axis of the lens and the incident light rays match (the lenses are respectively disposed at a ±3.3 degrees and a ±1.46 degrees so that the light rays are not obliquely incident on the lenses).

X in FIG. 10 indicates a distance in the optical axis direction (optical axis direction of the first scanning lens (L1)) when each surface is projected onto a surface perpendicular to the optical axis of the light deflector 3.

Each surface shape of the lens surface is provided by:

$$X(Y, Z) = \frac{Y^2 \cdot Cm}{1 + \sqrt{[1 - (1+K) \cdot (Y \cdot Cm)^2]}} + A \cdot Y^4 + B \cdot Y^6 + C \cdot Y^8 + \quad (4)$$

$$D \cdot Y^{10} + E \cdot Y^{12} + F \cdot Y^{14} \ldots + \frac{Cs(Y) \cdot Z^2}{1 + \sqrt{[1 - (Cs(Y) \cdot Z)^2]}} +$$

$$(F0 + F1 \cdot Y + F2 \cdot Y^2 + F3 \cdot Y^3 + F4 \cdot Y^4 + \ldots)Z$$

where, $Cm = 1/RY$, $Cs(Y) = 1/RZ$

Each surface with * in FIG. 10 has a non-circular shape in the main scanning direction. The surface is a special surface in which a curvature radius in the sub-scanning direction continuously changes depending on lens height. Each surface shape is provided in Equation (4). However, $Cs(Y)$ is provided by:

$$Cs(Y) = 1/RZ + aY + bY^2 + cY^3 + dY^4 + eY^5 + fY^6 + gY^7 + hY^8 + iY^9 + jY^{10} + kY^{11} + lY^{12} \quad (5)$$

Aspheric surface coefficients according to the embodiment are as follows.

Scanning lens shapes corresponding with an oblique angle of ±1.46 degrees are shown in FIG. 11. Scanning lens shapes corresponding with an oblique angle of ±3.3 degrees is shown in FIG. 12. However, the scanning lens L1 (the first scanning lens (L1) 4) is a shared lens. The shape of the first surface and the second surface are the same as those of the scanning lens L1 corresponding to the oblique angle ±1.46 degrees.

In the optical system according to the embodiment, a sound-proof glass having a thickness of 1.9 millimeters (refractive index 1.514) is inserted. The sound-proof glass is disposed at an angle of 10 degrees within the deflecting surface.

According to the present embodiment, the lens data is for scanning lenses used in a one-sided scanning method to which light beams are obliquely incident at ±3.3 degrees and ±1.46 degrees. The scanning lens L2 are disposed for each light ray. The shape of the scanning lens L2 corresponding to light beams having the same oblique angle and differing ± is a shape that is mirror-symmetrical in the sub-scanning direction to the surface including a normal line of the deflective reflecting surface of the polygon mirror 3 and a center of each light beam.

Figure 13A:
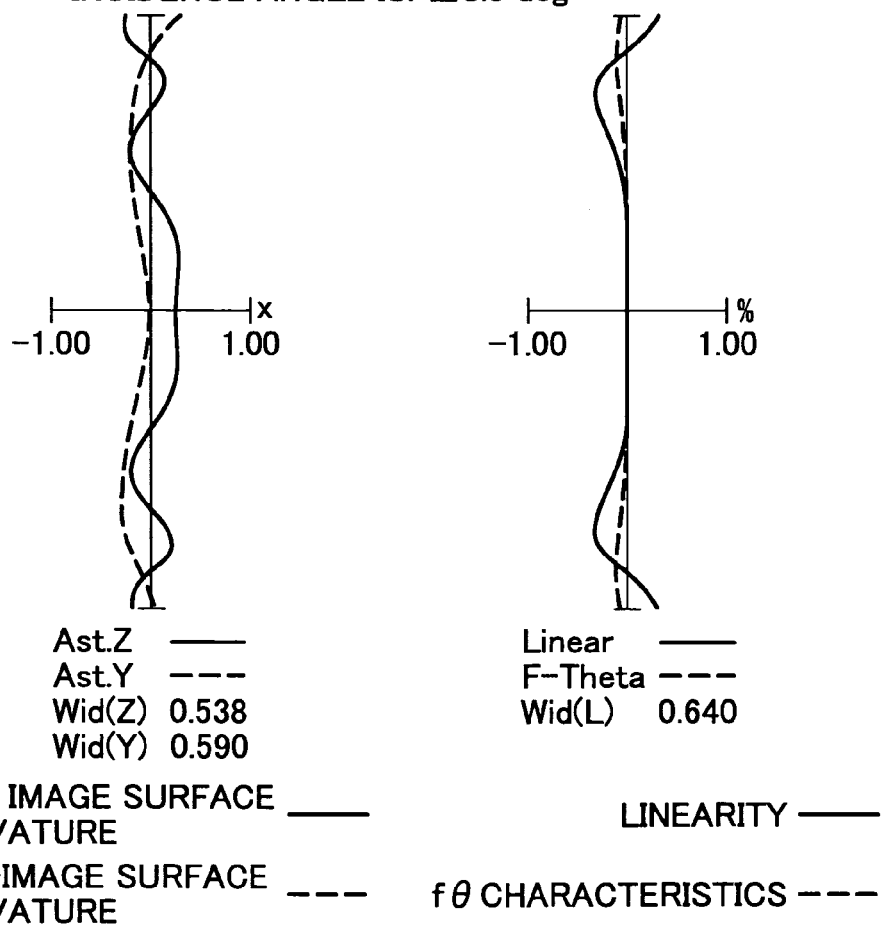
Figure 13B:
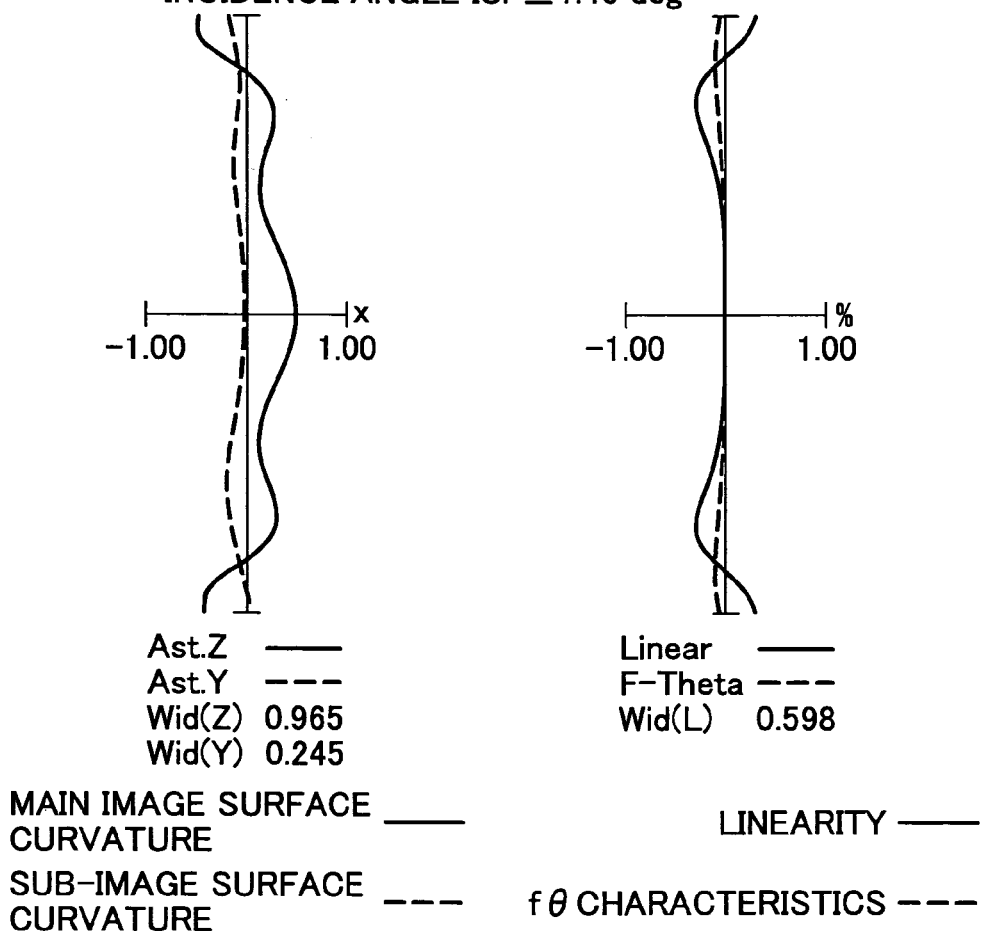

FIG. 13A and FIG. 13B are diagrams showing optical performances of the scanning lenses according to the embodiment. FIG. 13A is a diagram of aberrations occurring when the oblique incidence angle is ±3.3 degrees. FIG. 13B is a diagram of aberrations occurring when the oblique incidence angle is ±1.46 degrees.

All light beams are incident on a single light deflector by the above-described configuration. As a result, the optical scanning device can be reduced in size. In addition, cost related to the light deflector that makes up a high percentage of costs among the optical components forming the optical scanning device can be reduced. Moreover, power consumption and noise can be reduced. Even through such a configuration using the oblique incidence method, the scanning line curvature and the deterioration of the wavefront aberration can be effectively corrected by the above-described configuration of the optical surface.

The optical scanning device according to the present invention is included in the image forming device by the above-described configuration. An overall reduction in size can be achieved. In addition, cost, power consumption, and noise can be reduced. The scanning line curvature and the deterioration of the wave aberration can be effectively corrected. As a result, a high-quality image reproduction in which color images have no color shifts can be ensured.

The optical scanning device according to the present invention has an oblique incidence method configuration suitable for low cost, low power consumption, and reduced size. An optical scanning device that can effectively correct the scanning line curvature and the deterioration of the wave aberration can be actualized.

In addition, because the oblique incidence method configuration optical scanning device is used in the image forming device according to the present invention, cost, power consumption, and size can be reduced. Furthermore, the scanning line curvature and the deterioration of the wave aberration can be effectively corrected. Therefore, a high-image-quality image forming device with little color shifting even during temperature fluctuations can be actualized.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device including a plurality of light sources in which light beams emitted from the light sources are deflected by a shared light deflector and each deflected light beam is concentrated on different scanning-subject surfaces using an optical scanning system, wherein
the light beams emitted from the light sources make an angle in a sub-scanning direction to a normal line of a reflecting surface of the light deflector, and an incidence surface of at least one lens element included in the optical scanning system has a surface of which a curvature in the sub-scanning direction changes depending on a main scanning direction and is an optical surface of which a negative refracting power becomes stronger toward a periphery of the surface in the main scanning direction.

2. The optical scanning device according to claim 1, wherein a refracting power in the sub-scanning direction on a reference axis of the optical surface is set to zero or near zero.

3. The optical scanning device according to claim 1, wherein the light beams emitted from the light source device share the optical surface and each light beam is set to pass off-axis of the reference axis of the optical surface in the sub-scanning direction.

4. The optical scanning device according to claim 1, wherein all light beams respectively moving toward the different scanning-subject surfaces are set to share the optical surface.

5. The optical scanning device according to claim 1, wherein the optical surface is disposed closer to the light deflector than a lens element having a largest positive refractive index in the sub-scanning direction or a lens surface having a positive refractive index in the sub-scanning direction of a strongest refracting power.

6. The optical scanning device according to claim 1, wherein the optical surface is an incidence surface of a lens element closest to the light deflector.

7. The optical scanning device according to claim 1, wherein the optical scanning system includes lenses disposed in correspondence with each light beam emitted from each light source, in which the lenses have surfaces of which an amount of tilting and decentering in the sub-scanning direction differs in the main scanning direction.

8. The optical scanning device according to claim 1, wherein the optical scanning system includes lenses disposed in correspondence with each light beam emitted from each light source, in which the lenses have at least one surface of which an amount of shifting and decentering in the sub-scanning direction differs in the main scanning direction.

9. The optical scanning device according to claim 1, wherein the light source is a multi-beam light source emitting a plurality of light beams.

10. The optical scanning device according to claim 1, wherein each scanning-subject surface is a photoreceptor surface and at least four photoreceptor surfaces are included in the optical scanning device.

11. An image forming device including at least one image carrying body and an optical scanning device including an optical scanning and imaging system corresponding to the image carrying body that performs image formation by performing an optical scan on the image carrying body, the optical scanning device including a plurality of light sources in which light beams emitted from the light sources are deflected by a shared light deflector and each deflected light beam is concentrated on different scanning-subject surfaces using an optical scanning system, wherein the light beams emitted from the light sources make an angle in a sub-scanning direction to a normal line of a reflecting surface of the light deflector, and an incidence surface of at least one lens element included in the optical scanning system has a surface of which a curvature in the sub-scanning direction changes depending on a main scanning direction and is an optical surface of which a negative refracting power becomes stronger toward a periphery of the surface in the main scanning direction.

* * * * *